(12) United States Patent
Mylvaganam et al.

(10) Patent No.: US 10,691,169 B2
(45) Date of Patent: Jun. 23, 2020

(54) SAPPHIRE COVER FOR ELECTRONIC DEVICES

(71) Applicant: Apple Inc., Cupertino, CA (US)

(72) Inventors: Jeffrey C. Mylvaganam, Cupertino, CA (US); Erik G. de Jong, San Francisco, CA (US); Dale N. Memering, Langhorne, PA (US); Xiao Bing Cai, Suzhou (CN); Palaniappan Chinnakaruppan, Cupertino, CA (US); Jong Kong Lee, Melaka (MY); Srikanth Kamireddi, Cupertino, CA (US); Sawako Kamei, Cupertino, CA (US); Feng Min, Changzhou (CN); Jing Zhang, Shanghai (CN); Xiang Du, Shenzhen (CN); Sai Feng Liu, Shenzhen (CN)

(73) Assignee: APPLE INC., Cupertino, CA (US)

( * ) Notice: Subject to any disclaimer, the term of this patent is extended or adjusted under 35 U.S.C. 154(b) by 91 days.

(21) Appl. No.: 15/975,522

(22) Filed: May 9, 2018

(65) Prior Publication Data

US 2018/0284843 A1    Oct. 4, 2018

Related U.S. Application Data

(63) Continuation of application No. 14/836,943, filed on Aug. 26, 2015, now Pat. No. 9,977,464.
(Continued)

(51) Int. Cl.
*G06F 1/16*   (2006.01)
*G04B 37/00*  (2006.01)
(Continued)

(52) U.S. Cl.
CPC ............ *G06F 1/1637* (2013.01); *B05D 1/02* (2013.01); *B23K 26/364* (2015.10);
(Continued)

(58) Field of Classification Search
CPC .. B28D 5/00; B28D 5/022; B28D 5/04; B24B 9/16; B24B 7/228; B23K 26/402;
(Continued)

(56) References Cited

U.S. PATENT DOCUMENTS 3,740,944 A    6/1973   Chopard
3,911,670 A   10/1975   Hofer
(Continued)

FOREIGN PATENT DOCUMENTS

JP    H05-264750    10/1993
JP    2002091329     3/2002
(Continued)

*Primary Examiner* — Christopher J Besler
(74) *Attorney, Agent, or Firm* — Dorsey & Whitney LLP

(57) ABSTRACT

A cover for an electronic device and methods of forming a cover is disclosed. The electronic device may include a housing, and a cover coupled to the housing. The cover may have an inner surface having at least one of an intermediate polish and a final polish, a groove formed on the inner surface, and an outer surface positioned opposite the inner surface. The outer surface may have at least one of the intermediate polish and the final polish. The cover may also have a rounded perimeter portion formed between the inner surface and the outer surface. The rounded perimeter portion may be positioned adjacent the groove. The method for forming the cover may include performing a first polishing process on the sapphire component using a polishing tool, and performing a second polishing process on the groove of the sapphire component forming the cover using blasting media.

6 Claims, 18 Drawing Sheets

Related U.S. Application Data

(60) Provisional application No. 62/129,707, filed on Mar. 6, 2015, provisional application No. 62/042,533, filed on Aug. 27, 2014.

(51) Int. Cl.

| | | |
|---|---|---|
| *B24B 7/22* | (2006.01) | |
| *G04B 39/00* | (2006.01) | |
| *B23K 26/402* | (2014.01) | |
| *H01Q 1/24* | (2006.01) | |
| *B28D 5/00* | (2006.01) | |
| *B24B 29/00* | (2006.01) | |
| *B24B 37/04* | (2012.01) | |
| *B24C 11/00* | (2006.01) | |
| *B23K 26/364* | (2014.01) | |
| *B05D 1/02* | (2006.01) | |
| *B24C 1/08* | (2006.01) | |
| *B23K 103/00* | (2006.01) | |

(52) U.S. Cl.
CPC ............ *B23K 26/402* (2013.01); *B24B 7/228* (2013.01); *B24B 29/005* (2013.01); *B24B 37/04* (2013.01); *B24C 1/08* (2013.01); *B24C 11/00* (2013.01); *G04B 37/0008* (2013.01); *G04B 39/006* (2013.01); *G06F 1/163* (2013.01); *B23K 2103/50* (2018.08); *B23K 2103/54* (2018.08); *B28D 5/00* (2013.01); *H01Q 1/243* (2013.01)

(58) Field of Classification Search
CPC ... G04B 37/008; G04B 39/006; G06F 1/1601; G06F 1/1637; G06F 1/1656; H04M 1/185; H01Q 1/243
See application file for complete search history.

(56) References Cited

U.S. PATENT DOCUMENTS

| | | | |
|---|---|---|---|
| 4,561,783 A | 12/1985 | Lederrey | |
| 5,369,267 A | 11/1994 | Johnson et al. | |
| 5,545,277 A | 8/1996 | Hashemi et al. | |
| 6,206,563 B1 | 3/2001 | Dombre et al. | |
| 6,406,769 B1 | 6/2002 | Delabre | |
| 6,677,906 B2 | 1/2004 | Quinn et al. | |
| 7,712,954 B2 | 5/2010 | Bourban et al. | |
| 8,596,860 B2 | 12/2013 | Verdon et al. | |
| 8,721,917 B2 | 5/2014 | Cherian et al. | |
| 8,824,140 B2 | 9/2014 | Prest et al. | |
| 9,271,395 B2 | 2/2016 | Hongo et al. | |
| 9,288,294 B2 | 3/2016 | Lin et al. | |
| 9,369,553 B2 | 6/2016 | Zahler et al. | |
| 2003/0197648 A1 | 10/2003 | Quinn et al. | |
| 2005/0156908 A1 | 7/2005 | Sato et al. | |
| 2006/0196849 A1* | 9/2006 | Moeggenborg | B24B 37/0056 216/88 |
| 2006/0273304 A1 | 12/2006 | Cok | |
| 2008/0164578 A1 | 7/2008 | Tanikella et al. | |
| 2009/0104409 A1* | 4/2009 | Derriey | C03C 17/04 428/172 |
| 2009/0124062 A1 | 5/2009 | Yamazaki et al. | |
| 2010/0231466 A1 | 9/2010 | Hisaeda | |
| 2011/0019123 A1 | 1/2011 | Prest et al. | |
| 2011/0072856 A1 | 3/2011 | Davidson et al. | |
| 2011/0223840 A1 | 9/2011 | Morinaga et al. | |
| 2012/0118228 A1 | 5/2012 | Lee et al. | |
| 2012/0135177 A1 | 5/2012 | Cornejo et al. | |
| 2012/0299841 A1 | 11/2012 | Tang et al. | |
| 2013/0002583 A1 | 1/2013 | Jin et al. | |
| 2013/0071601 A1 | 3/2013 | Bibl et al. | |
| 2013/0140965 A1 | 6/2013 | Franklin et al. | |
| 2013/0188366 A1* | 7/2013 | Russell-Clarke | B24B 7/242 362/362 |
| 2013/0236699 A1 | 9/2013 | Prest et al. | |
| 2014/0178647 A1 | 6/2014 | Kim et al. | |
| 2015/0085429 A1 | 3/2015 | Memering et al. | |
| 2015/0085432 A1 | 3/2015 | Memering et al. | |
| 2015/0224594 A1* | 8/2015 | Wort | B23K 15/08 219/121.18 |
| 2016/0058375 A1 | 3/2016 | Rothkopf et al. | |
| 2016/0064800 A1 | 3/2016 | de Jong et al. | |
| 2016/0378069 A1 | 12/2016 | Rothkopf | |
| 2016/0378070 A1 | 12/2016 | Rothkopf | |
| 2016/0378071 A1 | 12/2016 | Rothkopf | |

FOREIGN PATENT DOCUMENTS

| | | |
|---|---|---|
| JP | 2006027023 | 2/2006 |
| JP | 2013021581 | 1/2013 |

* cited by examiner

SAPPHIRE COVER FOR ELECTRONIC DEVICES

CROSS-REFERENCE TO RELATED APPLICATIONS

This application is a continuation patent application of U.S. patent application Ser. No. 14/836,943, filed Aug. 26, 2015 and titled "Sapphire Cover for Electronic Devices," which is a nonprovisional patent application of and claims the benefit of U.S. Provisional Patent Application No. 62/129,707, filed Mar. 6, 2015, and titled "Sapphire Cover for Electronic Devices," and U.S. Provisional Patent Application No. 62/042,533, filed Aug. 27, 2014 and titled "Sapphire Cover for Electronic Devices," the disclosures of which are hereby incorporated herein by reference in their entireties.

FIELD

The disclosure relates generally to electronic devices, and more particularly to a cover for an electronic device and methods of forming the cover for the electronic device.

BACKGROUND

Electronic devices continue to become more prevalent in day-to-day activities. For example, smart phones, tablet computers and electronic devices continue to grow in popularity, and provide everyday personal and business functions to its users. These electronic devices may include screens or displays utilized by the user to interact (e.g., through input/output operations) with the electronic devices and/or receive information therefrom.

Conventionally, these screens or displays are made from reinforced or modified glass. However, these glass screens may still be susceptible to damage. Specifically, these conventional screens may scratch, chip or crack when an undesirable impact event or force (e.g., drop, crushed) occurs with the electronic device. Damage to the screens of the electronic device may render the device partially or completely inoperable and/or may prevent the user from utilizing the electronic device for its intended purposes.

The use of the crystalline form of alumina ($Al_2O_3$) (e.g., corundum), commonly known as sapphire, is becoming a viable option for replacing the glass screen or display. Specifically, with improved manufacturing processes of single crystal sapphire, and the improved functional characteristics (such as hardness and strength) of sapphire over glass, sapphire may be an acceptable replacement material for conventional glass screens and displays. However, the same chemical/elemental characteristics that make sapphire an often-superior material choice over glass may also make the manufacturing of sapphire difficult. That is, due to sapphire's hardness, processing or shaping sapphire may be difficult. For example, where the sapphire display includes curved or non-planar surfaces, conventional polishing techniques and processes may fall short of providing an adequate or desired polish on the curved or non-planar surfaces of the sapphire.

Thus, an improved process for forming and/or polishing a sapphire component including curved or non-planar surfaces may be useful.

SUMMARY

A method of forming a cover for an electronic device. The method comprises performing a first polishing process using a polishing tool on a planar surface of the sapphire component and/or a groove formed in the sapphire component adjacent the planar portion. The method also comprises performing a second polishing process on the groove of the sapphire component using blasting media.

A method of forming a cover for an electronic device. The method comprises forming a groove on an inner surface of a sapphire component, performing at least two intermediate polishing processes on the groove of the sapphire component, annealing the sapphire component, and performing a final polishing process on at least a portion of the annealed sapphire component.

An electronic device comprising a housing, and a cover coupled to the housing. The cover may comprise an inner surface having at least one of an intermediate polish, or a final polish, a groove formed on the inner surface, and an outer surface positioned opposite the inner surface. The outer surface may comprise at least one of the intermediate polish, or the final polish. The cover may also comprise a rounded perimeter portion formed between the inner surface and the outer surface. The rounded perimeter portion may be positioned adjacent the groove.

A method for applying a decorative ink to a cover for an electronic device. The method comprises pad printing ink on at least a portion of a planar surface of the cover. The portion of the planar surface may be positioned adjacent a groove formed in the cover. The method may also comprise positioning a masking structure on the cover adjacent the groove. The masking comprising a protective film placed on the planar surface, a spacer coupled to a portion of the protective film, and a rigid top component coupled to the spacer. The rigid top component may be positioned over the ink pad printed on at least the portion of the planar surface of the cover. Additionally, the method may comprise directly applying ink to the groove formed in the cover, and diffusively applying ink to at least a portion of the ink pad printed on at least the portion of the planar surface of the cover.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
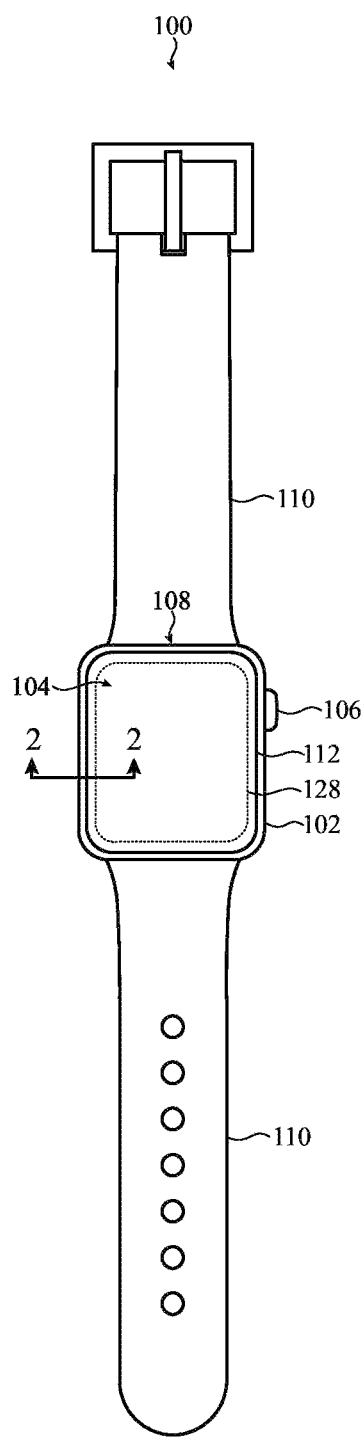
FIG. 1 depicts an illustrative perspective view of a wearable electronic device according to embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to electronic devices, and more particularly to a cover for an electronic device and methods of forming the cover for the electronic device.

In particular embodiments, processes for forming a cover glass, a housing, or other external feature of an electronic device include performing multiple and distinct polishing processes on some or all of the surfaces of the sapphire material forming the cover. For example, planar portions of the cover may be polished using a variety of polishing processes, such as chemical mechanical polishing (CMP), diamond mechanical polishing (DMP), polishing using polishing pads and/or polishing using blasting media. The polishing processes described herein may reduce surface roughness, smooth a surface, and/or make a surface more reflective or visually uniform. Curved surfaces, such as a rounded perimeter portion or a groove formed within the sapphire material, may be polished using a two-part polishing process. The two-part polishing process may include polishing using polishing pads and polishing using blasting media. The blasting media may be a diamond encrusted resin-based material that may have elastic properties to avoid damaging the surface of the sapphire material during polishing. Additionally, at least a portion of the surfaces of the cover may be polished after an annealing process is performed on the sapphire material. By performing multiple polishing processes, and specifically utilizing a multi-part polishing process for the curved (or otherwise non-planar) surfaces of the sapphire material, the cover may be polished to a desired finish and/or may have desired visual properties when used within an electronic device.

In certain embodiments, additional operations may be performed on the sapphire material after it is shaped and polished. For example, an ink can be pad printed on a planar surface of the sapphire material adjacent the curved surface formed in the sapphire material. The planar portions that were previously pad printed are then masked using a masking structure, and the curved portion is exposed. Further ink is than applied to the curved portion, for example by spraying the ink onto the curved portion. This additional ink may be the same type of ink as previously applied, or it may be different.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 shows an illustrative perspective view of a portable or wearable electronic device 100 (hereafter, "electronic device"), according to embodiments. Electronic device 100, as shown in FIG. 1, may be implemented as a smart watch, although this is but one example of a suitable electronic device 100. Electronic device 100 includes, amongst other components discussed herein, a cover 112 having a groove 128 formed therein. As discussed herein, cover 112 protects a display 104 and/or other internal components positioned within a housing 102 of electronic device 100. Additionally as discussed herein, groove 128 may receive and/or house a communicative component of electronic device 100, such as an antenna, to reduce the number of components positioned and/or requiring space within housing 102.

For aesthetic, visual and/or protective purposes, groove 128 formed in cover 112 may be polished, inked and/or painted. The polishing, inking and/or painting of groove 128 may provide uniform surface polishes of cover 112, to provide a uniform color or appearance to a user of electronic device 100 and/or to prevent the antenna positioned within groove 128 from being visible. The geometry of groove 128, and specifically the curved surface forming groove 128, may require unique processes for polishing, inking and/or painting the curved surface, when compared to the planar portions of cover 112, as discussed herein. In one embodiment, groove 128 undergoes a two-part polishing process including performing an initial polishing step using a polishing tool, such as a brush, and subsequently providing a blast media to groove 128 to perform a subsequent polishing step. From there, and after polishing groove 128, ink may be applied to groove 128 using a spray and/or pad printing process. This process ensures groove 128 has the unique geometry and/or the curved surface is polished and/or inked to a similar finish as the planar portions of cover 112.

In another embodiment, an interior of cover 112 including groove 128 can be inked and/or painted using a two-step process. Initially, certain interior planar portions of cover 112 can be painted, and subsequently masked, leaving groove 128 exposed. Once masked, ink may be sprayed and/or directly applied to groove 128, such that the masks prevent ink from being sprayed onto the previously painted planar portions of cover 112. The ink sprayed on groove 128 may be applied such that the ink formed on groove 128 is even with the ink applied to the planar portions of cover 112 (e.g., the resulting ink layer has a thickness that is substantially uniform and lacking in transitions), and/or so there is a seamless transition between the ink applied to the curved portion of cover 112 forming groove 128 and the planar portions of cover 112. Accordingly, the resulting ink layer covering both groove 128 and planar portions of cover 112 appears continuous and without any transition visible to the human eye.

Figure 2:
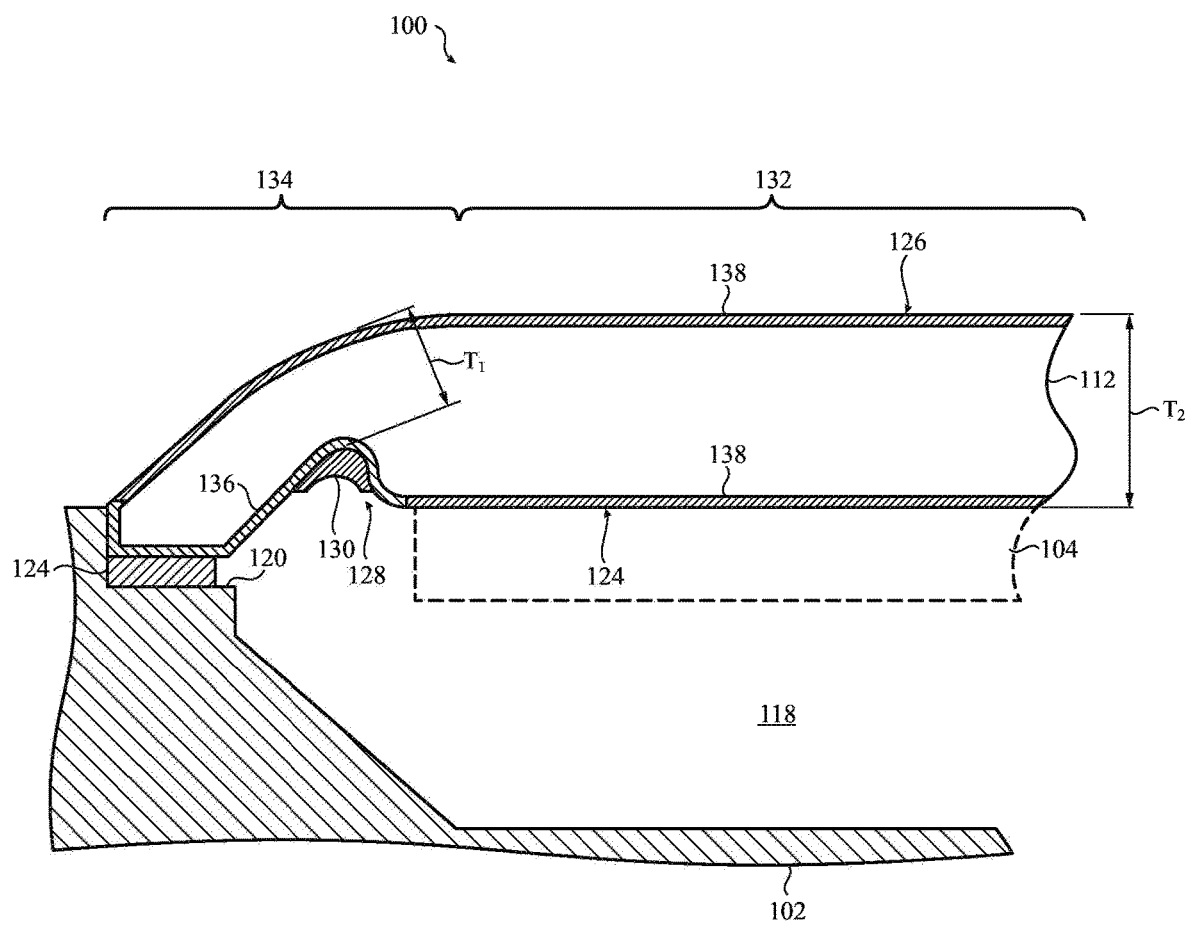
FIG. 2 depicts an enlarged cross-section view of a portion of the electronic device of FIG. 1 taken along line 2-2, according to embodiments.

FIG. 2 depicts an enlarged cross-section view of a portion of electronic device 100 of FIG. 1 taken along line 2-2, according to an embodiment. With respect to this particular embodiment, FIG. 2 shows a cross-section view of a portion of housing 102 and cover 112 of electronic device 100. A space or opening 118 may be formed between housing 102 and cover 112; the opening 118 may receive additional components of electronic device 100. More specifically, opening 118 of electronic device 100 may receive and/or may provide space for certain or all internal components of electronic device 100. In the non-limiting example of FIG. 2, display 104 is shown in phantom and may be positioned within at least a portion of opening 118 formed between cover 112 and housing 102. As discussed herein with respect to FIG. 1, display 104 may be formed from any suitable user-interactive display technology, and may have touch-sensing functionality or may be associated with a touch sensor. Additionally, display 104 may be protected by cover 112 positioned above and/or coupled to display 104 positioned within a portion of opening 118 of electronic device 100. The cover 112 may be transparent or translucent, fully or partially, in certain embodiments.

Cover 112 of electronic device 100 may be formed from a substantially annealed and polished sapphire material. That is, and as discussed herein, cover 112 may be formed from an annealed sapphire material having all or some portions of the surface polished prior to and/or subsequent to the annealing. By annealing the sapphire material, cover 112 may be provided with increased hardness, and/or may also have planar surfaces that may be more easily processed and/or may facilitate transparency in the sapphire material forming cover 112. Additionally, the process of annealing the sapphire material may also fill in or seal cracks or other surface defects formed in the sapphire material during processing.

As shown in FIG. 2, cover 112 may be coupled to housing 102. More specifically, a portion of cover 112 may be positioned above and, may be coupled to, a shelf portion 120 formed adjacent a perimeter of housing 102. Shelf portion 120 may be formed substantially around the entire perimeter of housing 102, and may receive and/or couple a portion of cover 112 to housing 102. As shown in FIG. 2, cover 112 may be coupled to shelf portion 120 of housing 102 using an adhesive, such as adhesive tape. However, it is understood that cover 112 may be coupled to shelf portion 120 of housing 102 using any suitable coupling component or technique. In additional non-limiting examples, cover 112 of electronic device 100 may be coupled to housing 102 using chemicals, adhesives, bonding agents, laser welding, melting, and mechanical coupling components (snap-fit structures, detents, screws, and the like).

Cover 112, as shown in FIG. 2, may define an inner surface 124, and an outer surface 126 positioned opposite inner surface 124. Inner surface 124 may be positioned adjacent to opening 118 and may not be exposed to a user of electronic device 100. As shown in FIG. 2, and as discussed herein, display 104 (shown in phantom) may be positioned adjacent to and/or may be coupled to inner surface 124. Outer surface 126 may be exposed to, and/or may be contacted by a user of electronic device 100 when the user is interacting with display 104.

As shown in FIG. 2, cover 112 may have a groove 128 formed on inner surface 124. More specifically, groove 128 may be formed on inner surface 124, substantially around the entire perimeter of cover 112. Groove 128 may be formed partially through a portion of cover 112.

As a result of forming groove 128 on inner surface 124 of cover 112, the thickness of cover 112 may vary. That is, as shown in FIG. 2, a first thickness (T1) of cover 112 may be defined between inner surface 124 of groove 128 and outer surface 126. This first thickness (T1) may be substantially smaller than a second thickness (T2) of a portion of cover 112 defined in a non-groove bearing region, such as above the display 104. As discussed herein, the first thickness (T1) may alter and/or affect various polishing processes performed on the sapphire material forming cover 112. Additionally as discussed herein, groove 128 may be formed in cover 112 using a plurality of processes including laser-cutting groove 128 on inner surface 124, and subsequently computer numerical control (CNC) machining the laser cut groove 128 formed in cover 112.

Groove 128 may be formed in cover 112 for a variety of functions. In a non-limiting example, groove 128 may be formed in cover 112 to provide additional space within electronic device 100 for additional components. In the non-limiting example, groove 128 may receive and/or may house an antenna (not shown) of electronic device 100, such that the antenna may be positioned within groove 128 of cover 112 without occupying space within opening 118 of electronic device 100. The antenna may be used to share (e.g., send, receive) data collected and/or determined by the electronic device 100. In another non-limiting example, groove 128 may provide a coupling surface for display 104, where a portion of display 104 may be positioned within and/or coupled to groove 128 to position display 104 adjacent inner surface 124 of cover 112.

In a further, non-limiting example, groove 128 may be formed within cover 112 to provide a visual boundary or border for display 104. More specifically, and as shown in FIG. 2, a decorative ink 150 may be applied to inner surface 124 of groove 128 positioned substantially around the entire perimeter of cover 112, such that the decorative ink 150 may provide an ink border around display 104 of electronic device 100. As a result of forming groove 128 between display 104 and housing 102, decorative ink 150 may be applied to inner surface 124 of groove 128 to provide a decorative border around display 104, so a user of electronic device 100 may clearly identify the interactive area of display 104. Decorative ink 150 may be visible through outer surface 126 as a result of the transparent properties of the sapphire material forming cover 112. As discussed herein, decorative ink 150 may be applied to inner surface 124 of groove 128 using a plurality of pad printing processes and by spraying decorative ink within groove 128.

Cover 112 may also include distinct portions. More specifically, as shown in FIG. 2, cover 112 may have a substantially planar or linear portion 132 and rounded perimeter portion 134. Substantially planar portion 132 may be formed in the center of cover 112 (or as a center of the cover) such that display 104 may be completely visible and/or not distorted by cover 112. That is, substantially planar portion 132 may be formed adjacent to the perimeter of cover 112. Display 104 may be formed in substantial alignment with planar portion 132 of cover 112 to allow display 104 to be completely viewed by a user of electronic device 100, without potentially altering the image of display 104 due to a curvature in cover 112 (e.g., rounded perimeter portion 134).

Rounded perimeter portion 134 may be formed around at least a portion of the perimeter of cover 112. More specifically, and as shown in FIG. 2, rounded perimeter portion 134 may form the perimeter of cover 112, and may be positioned adjacent to the perimeter of housing 102. Rounded perimeter portion 134 may be positioned adjacent to groove 128 formed on inner surface 124. As shown in FIG. 2, rounded perimeter portion 134 may be coupled to shelf portion 120, and ultimately couple cover 112 to housing 102. As discussed herein, planar portion 132 and rounded perimeter portion 134 of cover 112 may be formed in a shaping process of the sapphire material used to form cover 112. That is, and as discussed herein, the sapphire material may be lapped, machined and/or laser cut to from planar portion 132 and rounded perimeter portion 134 of cover 112.

Substantially all surfaces (e.g., inner surface 124, outer surface 126) of cover 112 may be polished. More specifically, as shown in FIG. 2, both inner surface 124 and outer surface 126 of cover 112 may have an intermediate polish 136 and/or a final polish 138. As discussed herein, intermediate polish 136 may be formed on a surface of cover 112 prior to performing an annealing process on the sapphire material forming cover 112. Additionally as discussed herein, final polish 138 may be formed on a surface of cover 112 subsequent to performing the annealing process on the sapphire material forming cover 112.

In a non-limiting example, as shown in FIG. 2, outer surface 126 of cover 112 may only have final polish 138. That is, final polish 138 may substantially cover all of outer surface 126 of cover 112, including both planar portion 132 and rounded perimeter portion 134. Distinct from outer surface 126, inner surface 124 of cover 112 may have both intermediate polish 136 and final polish 138. More specifically, as shown in FIG. 2, inner surface 124 of planar portion 132 may have final polish 138, and inner surface 124 of rounded perimeter portion 134 of cover 112 may have intermediate polish 136. Additionally as shown in FIG. 2, intermediate polish 136 may also be formed on inner surface 124 including groove 128 of cover 112.

The respective polishes (e.g., intermediate polish 136, final polish 138) may be formed on distinct portions of cover 112 based on, at least in part, the material used to form cover 112, the processes used to form cover 112, and/or the dimensions of cover 112. For example, dependent on the dimension of first thickness (T1), and/or the difference between first thickness (T1) and second thickness (T2) of cover 112, a portion or all of the surfaces (e.g., inner surface 124, outer surface 126) of rounded perimeter portion 134 may or may not be polished during a final polishing process, as discussed herein.

As one example, certain surfaces may not be polished to avoid and/or prevent damage (e.g., breakage, cracking) to cover 112 during the final polishing process. That is, where first thickness (T1) is below a predetermined threshold thickness inner surface 124 and/or outer surface 126 forming a part of rounded perimeter portion 134 of cover 112 may not be subject to a final polish 138. The predetermined threshold thickness for cover 112 may be a minimal thickness of rounded perimeter portion 134, including groove 128, that may withstand the final polishing process to provide final polish 138 without damaging cover 112.

In a non-limiting example, as shown in FIG. 2 and discussed herein, cover 112 may be formed from an annealed sapphire material. Additionally as discussed herein, the first thickness (T1) in cover 112 between groove 128 and outer surface 126 may be substantially smaller than the second thickness (T2) in cover 112. First thickness (T1) may also be substantially equal to, or slightly above, a predetermined threshold thickness for cover 112. As a result of the dimension of first thickness (T1) of cover 112, inner surface 124 forming part of rounded perimeter portion 134 of cover 112 may be subject to intermediate polish 136, and not final polish 138, to substantially prevent any damage to cover 112. However, because first thickness (T1) may be substantially equal to, or slightly above, a predetermined threshold thickness, a final polish may be performed or placed on outer surface 126 of rounded perimeter portion 134 without substantially damaging cover 112.

Figure 3:
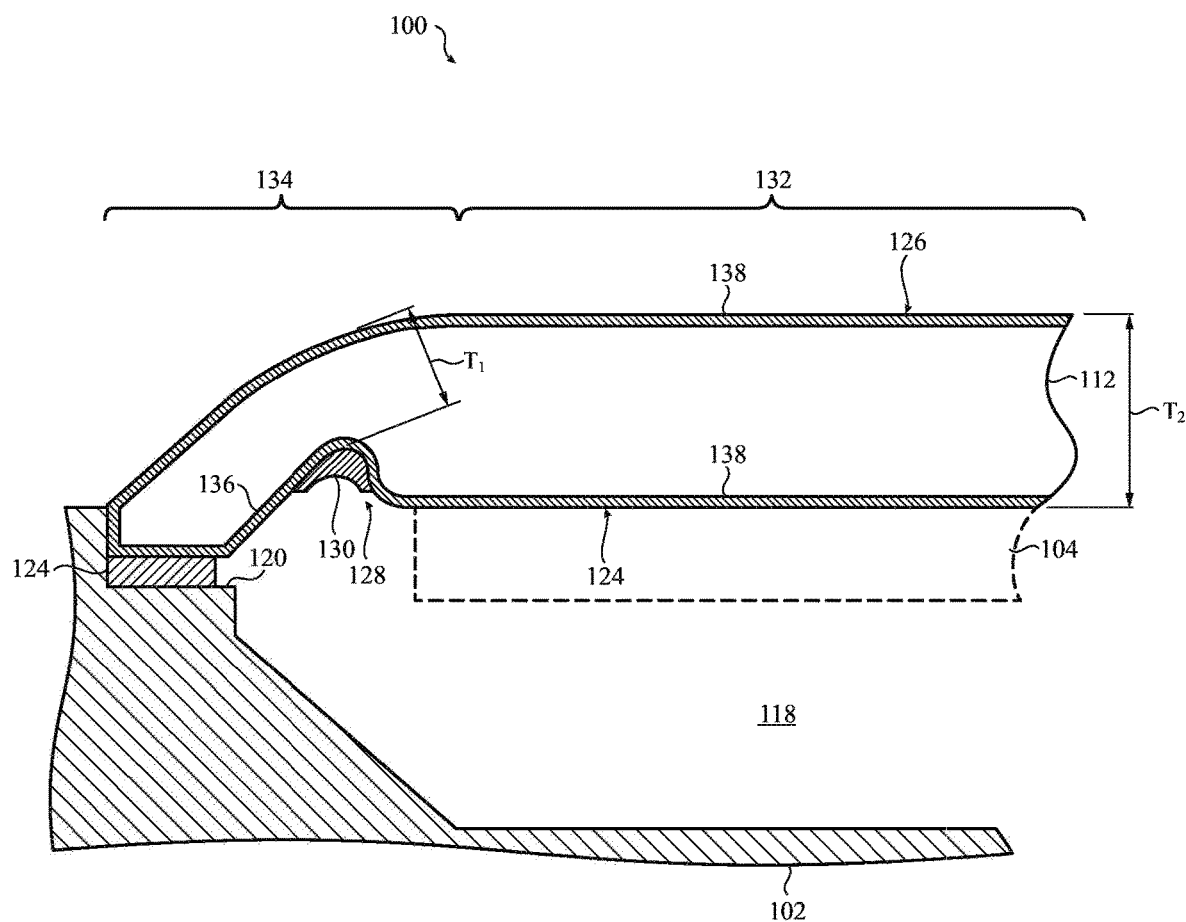
FIG. 3 depicts an enlarged cross-section view of a portion of the electronic device of FIG. 1 taken along line 2-2, according to additional embodiments.

In another non-limiting example, as shown in FIG. 3, all surfaces (e.g., inner surface 124, outer surface 126) of cover 112 may include final polish 138. That is, both inner surface 124 and outer surface 126 of planar portion 132 and rounded perimeter portion 134 of cover 112 may only have final polish 138. In the non-limiting example shown in FIG. 3, all surfaces of cover 112 may have final polish 138 as a result of first thickness (T1) of cover 112 being substantially above or greater than the predetermined threshold thickness, as discussed herein. As such, both inner surface 124 and outer surface 126 of cover 112 may undergo a final polishing process, as discussed herein, without potentially damaging cover 112.

Figure 4:
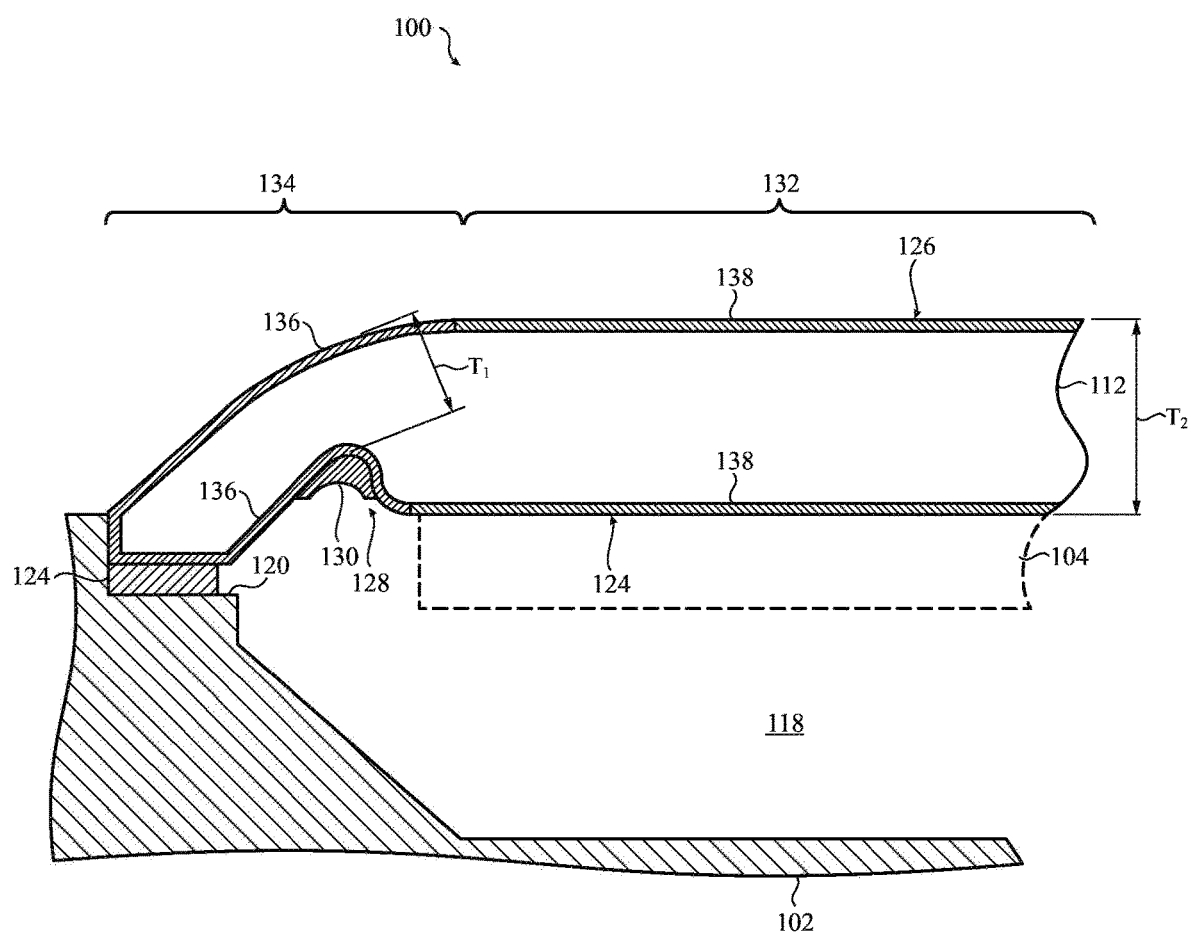
FIG. 4 depicts an enlarged cross-section view of a portion of the electronic device of FIG. 1 taken along line 2-2, according to additional embodiments.

In an additional non-limiting example, as shown in FIG. 4, inner surface 124 and outer surface 126 of rounded perimeter portion 134 of cover 112 may include intermediate polish 136. That is, both inner surface 124 and outer surface 126 of rounded perimeter portion 134 of cover 112 may only have intermediate polish 136, and inner surface 124 and outer surface 126 of planar portion 132 may have final polish 138. In the non-limiting example shown in FIG. 4, all surfaces of rounded perimeter portion 134 may include intermediate polish 136 as a result of first thickness (T1) of cover 112 being substantially below or smaller than the predetermined threshold thickness, as discussed herein. As such, both inner surface 124 and outer surface 126 of rounded perimeter portion 134 of cover 112 may not undergo a final polishing process, as discussed herein, to prevent and/or avoid damaging cover 112.

Figure 5:
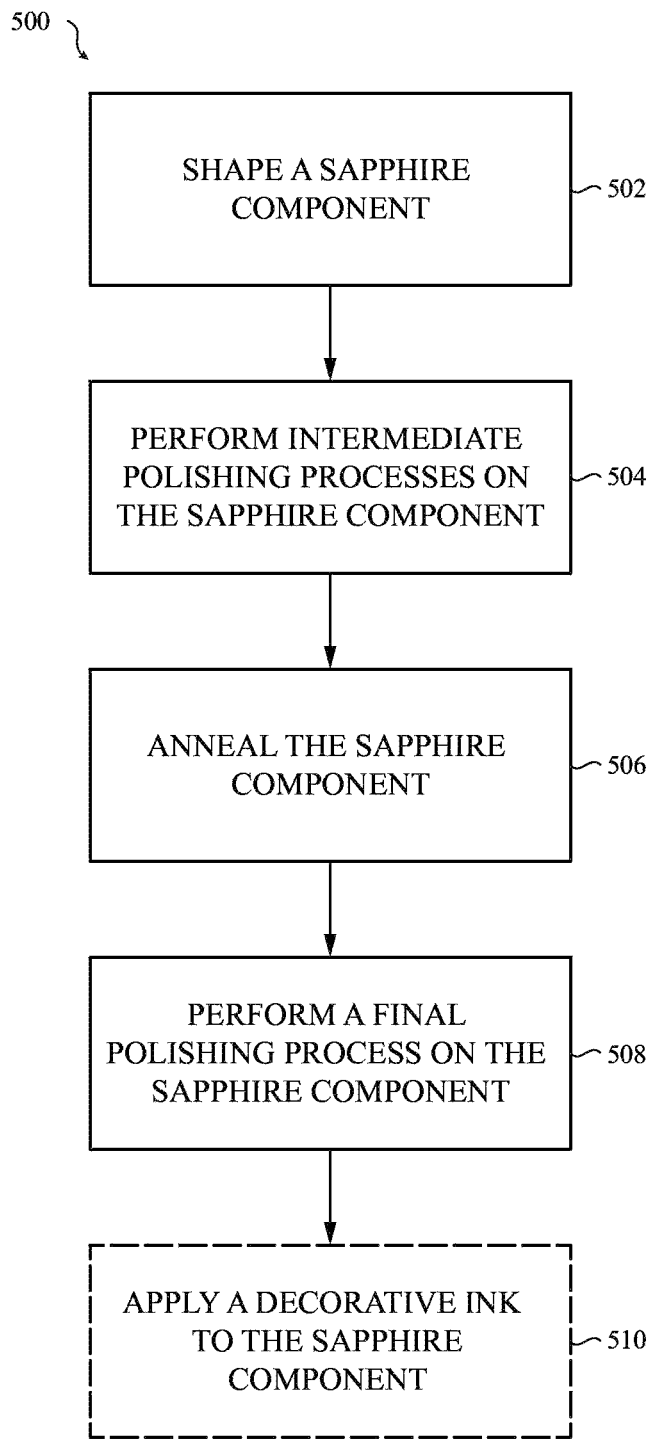
FIG. 5 depicts a flow chart of an example process for forming a cover for an electronic device, according to embodiments.

FIG. 5 depicts an example process for forming a cover for an electronic device. Specifically, FIG. 5 is a flowchart depicting one example process 500 for forming a cover for an electronic device. In some cases, the process 500 may be used to form one or more covers 112 for electronic device 100, as discussed above with respect to FIGS. 1-4.

In operation 502, a sapphire component may be shaped. In a non-limiting example, a piece of sapphire material may undergo various shaping processes, to provide a beginning shape of a cover for an electronic device. The shaping of the sapphire component may be achieved by lapping the sapphire material to thin the component. Lapping of the sapphire material may also form planar portions of the sapphire component. The shaping may also be performed by forming a rounded perimeter portion on an outer surface and/or about the perimeter of the sapphire material.

As one non-limiting example, rounded perimeter portions may be formed on the sapphire material, adjacent to the planar portions, using a computer numerical control (CNC) machining process. As another example, the rounded perimeter portions may be formed by laser ablating material from the sapphire surface. The shaping process of the sapphire component may further include laser cutting a rough groove into an inner surface of the sapphire material, and subsequently machining the laser cut groove formed in the sapphire material. The machining of the laser cut groove may be accomplished using any suitable material removal process including, but not limited to, CNC machining, drilling, milling, and grinding. Additionally, the rounded perimeter portions and groove formed within the sapphire material may be positioned adjacent one another. That is, the groove may be positioned adjacent to and/or substantially within the rounded perimeter portions formed in the sapphire material.

In operation 504, intermediate polishing processes may be performed on the sapphire component. At least two distinct polishing processes may be performed on portions of the sapphire component, although both need not be performed in a single embodiment. More specifically and by way of example, a first polishing process may be performed on the sapphire component using a polishing brush or other polishing tool, and a second polishing process may be performed on the sapphire component using blasting media.

In some embodiments, the first polishing process and the second polishing process may be performed at least on the surfaces of the rounded perimeter portions of the sapphire component, and the groove of the sapphire component. That is, inner and outer surfaces of the rounded perimeter portions, and the groove formed on the sapphire component, may undergo a polishing process using a polishing tool and blasting media. The polishing tool, such as a brush, used in the first polishing process may be any suitable, compliant polishing tool, one example of which is a pig hair brush or pad. The blasting media utilized in the second polishing process may be a diamond encrusted resin-based material, which is a material formed from resin and diamond pieces, fragments, particles and the like. The diamond particles may be encased or otherwise fully or partially contained within the resin. Other materials, such as sapphire, may be used in place of diamond in some embodiments.

The diamond encrusted resin-based material may be applied to the surfaces of the rounded perimeter portions of the sapphire component using a dispensing system that may dispense, apply, or otherwise provide the blasting media to the surfaces of the sapphire component with high force or pressure to polish the surface. For example, the diamond encrusted resin-based material may be blown or otherwise propelled toward the surface to be polished. In order to prevent damage to the surface of the sapphire component, the diamond encrusted resin-based material may have substantially elastic properties, and may substantially deform when first contacting the surface of the sapphire component. The rounded perimeter portions and the groove formed in the sapphire component may undergo the first polishing process (e.g., polishing tool) and second polishing process (e.g., blasting media) to ensure the non-linear and/or non-planar surfaces of the rounded perimeter portions and the groove are adequately polished.

Intermediate polishing processes may be performed in operation 504. Specifically, other portions of the sapphire component may undergo distinct polishing processes when performing the intermediate polishing processes on the sapphire component. The planar portions of the sapphire component may be polished using a chemical mechanical polishing (CMP) process and/or a diamond mechanical polishing (DMP) process. These intermediate polishing processes may be performed on the remaining portions of the sapphire component to ensure that all surface of the sapphire component may have an intermediate polish.

In operation 506, the sapphire component may be annealed. In a non-limiting example, the polished sapphire component may undergo an annealing process to strength the sapphire material used to form the cover for the electronic device. The annealing process may substantially fill or seal any cracks or damage of the sapphire component formed during the shaping processes of operation 502 and/or the polishing processes in operation 504.

In operation 508, a final polishing process may be performed on the sapphire component. In a non-limiting example, a final polishing process may be performed on the surface of at least a portion of the annealed sapphire component. The final polishing process may further include polishing the inner surface of the annealed sapphire component adjacent to, but not within, the groove, or polishing the inner surface of the annealed sapphire component including the groove. The groove may be finally polished using a compliant polishing pad, where at least a portion of the pad may contour into the groove, and polish the portion of the inner surface formed within the groove. In addition, the final polishing process may include polishing the outer surface of the annealed sapphire component adjacent to, but not on, the rounded perimeter portions, or polishing the outer surface of the annealed sapphire component including the rounded perimeter portions. Like the groove, the rounded perimeter portions may be polished using a compliant polishing pad that may contour around the rounded outer surface of the rounded perimeter portions of the sapphire component.

The portions of the surface that may undergo the final polishing process may be dependent, at least in part, on the dimension of the rounded perimeter portions formed in the sapphire component, and specifically, the thickness between the inner surface of the groove and the outer surface of the sapphire component. Where the thickness is smaller than a predetermined thickness threshold for the sapphire component, the final polishing of the rounded perimeter portions in operation 508 may damage the sapphire component forming the cover for the electronic device.

In optional operation 510, a decorative ink may be applied to the sapphire component. In a non-limiting example, a decorative ink may be applied to the groove formed on the inner surface of the sapphire component, and/or portions of the cover positioned adjacent the groove. Applying the decorative ink to the groove and/or portions of the cover adjacent the groove may include performing a preliminary pad printing process in the groove. The preliminary pad printing process may provide an initial layer of ink and/or a decorative image to the surface of the groove.

Applying the decorative ink may also include covering a portion of the sapphire component positioned adjacent the groove with a protective mask, and subsequently spraying the groove with the decorative ink. The protective mask, covering the portions of the sapphire component adjacent the groove, may prevent any sprayed decorative ink from undesirably contacting or forming on the sapphire component outside of the groove. Finally, the applying of the decorative ink may include performing a subsequent pad printing process in the groove including the decorative ink. The subsequent pad printing process may provide the groove of the sapphire component with the final image, design and/or paint to be viewed by a user of the electronic device including the cover formed from the sapphire component.

The final polishing of at least a portion of the sapphire component in operation 508 may form the cover to be utilized and/or implemented within an electronic device. The optional operation 510 may be performed on the sapphire component to provide a cosmetic feature of the cover, as discussed herein.

It is understood that the processes discussed herein for forming polished cover 112 for electronic device 100 may be performed on other components having distinct features and/or geometries. That is, the processes discussed herein with respect to FIG. 5 may be performed on a variety of components that may have features having non-planar and/or relatively tight or narrow tolerances that make conventional or traditional polishing processes difficult. Additionally, the processes discussed herein may also be performed on any alumina material, or substantially rigid material.

Turning to FIGS. 6A-6J, cover 112 is shown undergoing various operations that may be performed in accordance with process 500 of FIG. 5. It is understood that similarly numbered components may function in a substantially similar fashion. Redundant explanation of these components has been omitted for clarity.

Figure 6A:
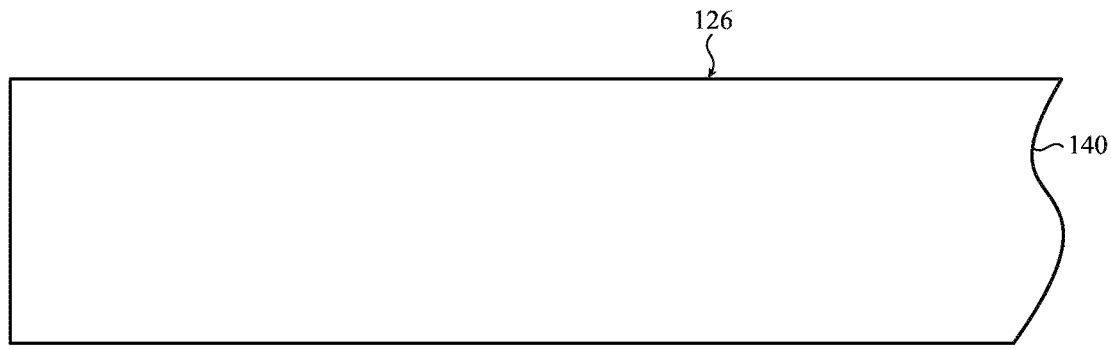
FIG. 6A depicts a cross-sectional view of sapphire material for forming a cover of an electronic device as depicted in FIGS. 1 and 2, according to embodiments.
Figure 6B:
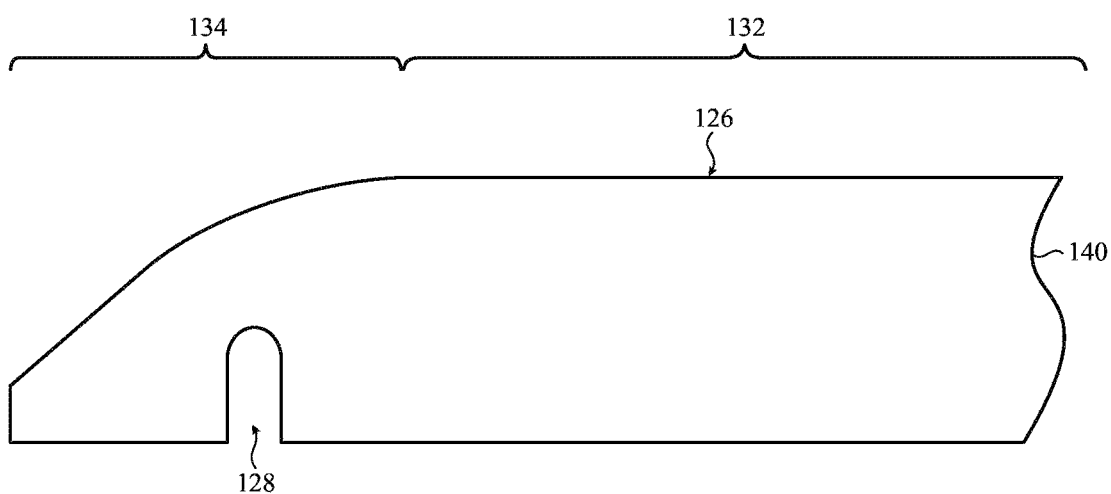
FIGS. 6B and 6C depict cross-sectional views of the sapphire material of FIG. 6A undergoing lapping, laser cutting and machining processes for forming the cover for an electronic device as depicted in FIGS. 1 and 2, according to embodiments.
Figure 6C:
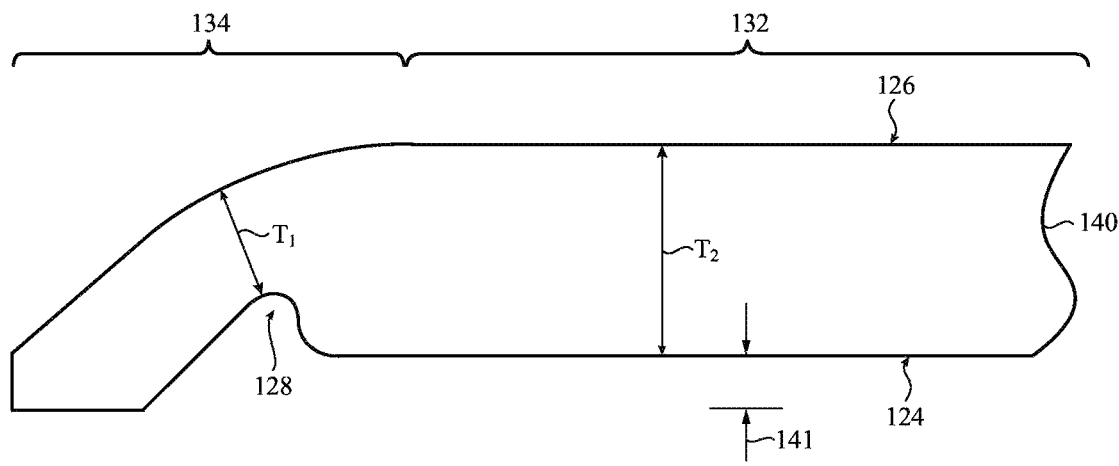
Figure 6D:
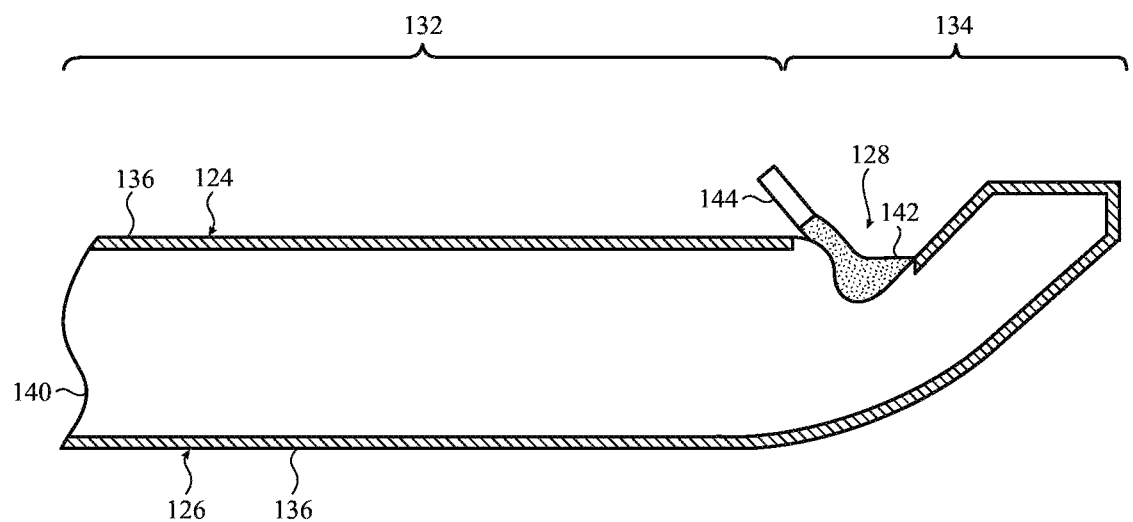
FIG. 6D depicts a cross-sectional view of the sapphire material of FIG. 6A undergoing intermediate polishing processes for forming the cover for an electronic device as depicted in FIGS. 1 and 2, according to embodiments.
Figure 6E:
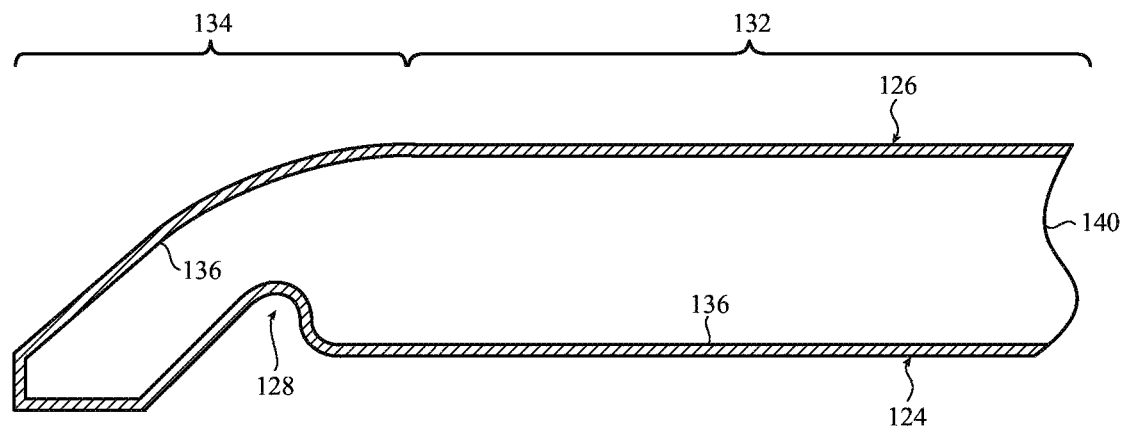
FIG. 6E depicts a cross-sectional view of the sapphire material of FIG. 6A subsequent to performing the intermediate polishing processes as depicted in FIG. 6D, according to embodiments.
Figure 6F:
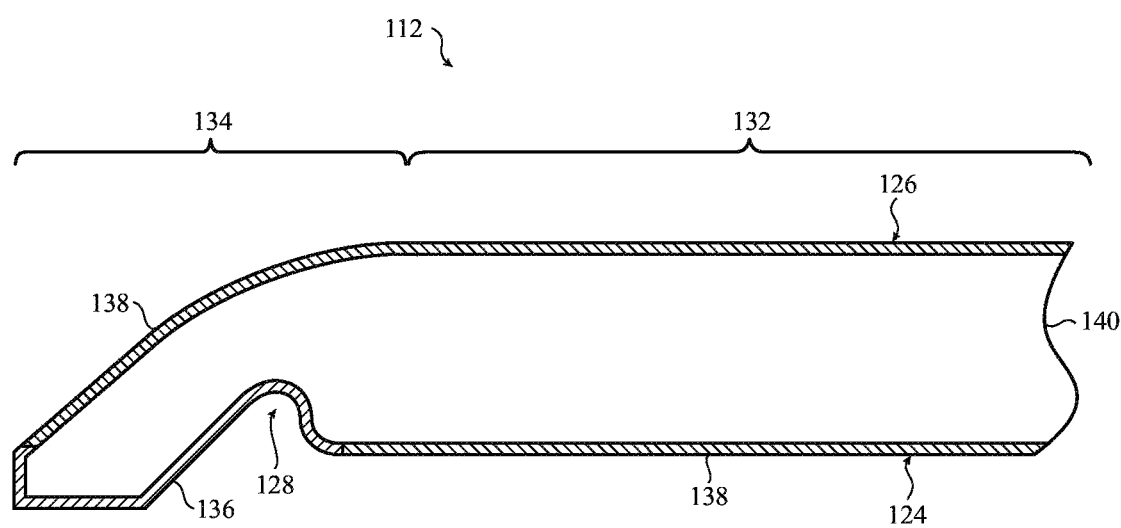
FIG. 6F depicts a cross-sectional view of the sapphire material of FIG. 6A subsequent to performing a final polishing process for forming the cover for an electronic device as depicted in FIGS. 1 and 2, according to embodiments.

FIG. 6A depicts an enlarged, front cross-section view of a portion of sapphire material 140 that may be form cover 112 (see, FIG. 6F). As discussed herein, sapphire material 140 may undergo various shaping processes to form cover 112. Sapphire material 140, as shown in FIG. 6A may be cut from a large boule of sapphire material grown specifically to form cover 112. Sapphire material 140 may be cut from a larger boule of material to a workable size that may undergo various processes to form a single cover 112 for electronic device 100. As shown in FIG. 6A, sapphire material 140 may be cut from the boule of material using any suitable cutting process including laser cutting and diamond cutting.

Additionally, surfaces of sapphire material 140 may undergo a lapping process. In a non-limiting example, as shown in FIG. 6A, at least outer surface 126, and in certain embodiments all surfaces, of sapphire material 140 may undergo a rough lapping process. The rough lapping process may remove any excess material formed on the surfaces of sapphire material 140 in order to make the surfaces of sapphire material 140 substantially flat and/or planar. The rough lapping process, and ultimately the planarization of the surfaces of sapphire material 140 may allow for easier subsequent processing on sapphire material 140.

FIG. 6B depicts sapphire material 140 that has undergone one or more machining processes to form a profile for cover 112. For example, sapphire material 140 may undergo a machining process to form rounded perimeter portion 134. The machining process may include a CNC machining process to remove material from sapphire material 140 to form rounded perimeter portion 134.

Additionally, as shown in FIG. 6B, groove 128 may be preliminarily formed in sapphire material 140 using a laser etching process. As shown in FIG. 6B, and with comparison to FIG. 6C, groove 128 formed in sapphire material 140 using the laser etching process may be a preliminary shape that may be subsequently processed and/or reshaped.

Turning to FIG. 6C, sapphire material may be subsequently machined to form a final groove 128 on inner surface 124. More specifically, rough groove 128, shown in FIG. 6B may undergo additional CNC machining processes (e.g., rough CNC, fine CNC, and the like) to form a substantially final shape for groove 128 in sapphire material 140.

Additionally as shown in FIG. 6C, cavity 141 of sapphire material 140 may be formed using a machining process. In a non-limiting example, a CNC machining process may be performed opposite outer surface 126 to remove material from sapphire 140. The CNC machining process may form cavity 141 adjacent inner surface 124 of sapphire material 140. Additionally, cavity 141 may be formed adjacent and/or between groove 128 formed in sapphire material 140. As discussed herein, cavity 141 may provide space within opening 118 of electronic device 100 to house components of electronic device 100.

As shown in FIG. 6C and as discussed herein, the shaping of sapphire material 140, and more specifically, the lapping, laser ablating and machining of sapphire material 140 to form groove 128, may substantially reduce the thickness of cover 112 in rounded perimeter portion 134. As shown in FIG. 6C, the first thickness (T1) between groove 128 and outer surface 126 may be substantially smaller than the second thickness (T2) formed between inner surface 124 and outer surface 126 in planar portion 132 of cover 112. Additionally, in the non-limiting example as shown in FIG. 6C, the first thickness (T1) may be substantially equal to, or slightly greater than, a predetermined threshold thickness for cover 112. As discussed herein, the first thickness (T1), when compared to the predetermined threshold thickness may affect further processing (e.g., final polishing process) of cover 112. The shaping of sapphire material 140 to form the cover 112, as shown in FIGS. 6A-C, may correspond to operation 502 of FIG. 5.

FIG. 6D shows sapphire material 140 undergoing intermediate polishing processes. In a non-limiting example, as shown in FIG. 6D, sapphire material 140 forming cover 112 (see, FIG. 6F) may have undergone some of the intermediate polishing processes. As shown in FIG. 6D, a portion of inner surface 124 may have undergone polishing processes to form intermediate polish 136 on a portion of inner surface 124. More specifically, planar portion 132 of inner surface 122 may be polished using a chemical mechanical polishing (CMP) and/or a diamond mechanical polishing (DMP) process.

FIG. 6D also shows sapphire material 140 currently undergoing a second polishing process using blasting media 142. In a non-limiting example, inner surface 124 of rounded perimeter portion 134 is shown undergoing a polishing process that utilizes blasting media 142. The blasting media 142 may be a diamond encrusted resin-based material or a diamond impregnated elastomer resin, that may contact inner surface 124 of sapphire material 140 under high-pressure to substantially polish inner surface 124. The diamond-encrusted resin-based material may also have elastic properties, such that when the blasting media 142 is provided to the surface of sapphire material 140 under high-pressure and/or high-speeds, blasting media 142 may substantially deform to reduce the impact force of blasting media 142 on inner surface 124. As shown in FIG. 6D, blasting media 142 may be provided to inner surface 124 of rounded perimeter portion 134, and specifically groove 128, via dispensing nozzle 144. Blasting media 142 may be dispensed via nozzle 144 and may subsequently slide or flow along inner surface 124 of groove 128 to form intermediate polish 136 on inner surface 124. Subsequent to, or prior to, polishing inner surface 124 of rounded perimeter portion 134 using blast media 142, inner surface 124 may undergo another polishing process using a polishing brush (not shown). The polishing brush or pad used to polish inner surface 124 of groove 128 may be any suitable polishing brush or pad that may be compliant and/or deformable such that the polishing brush or pad may polish the non-planar or curved surface of rounded perimeter portion 134 and/or groove 128. By using blasting media 142 and the compliant polishing brush or pad (not shown) to polish inner surface 124 of rounded perimeter portion 134 and/or groove 128, it may be ensured that inner surface 124 of rounded perimeter portion 134, including groove 128, may be adequately polished. That is, because of the compliant and/or deformable properties of blasting media 142 and the compliant polishing brush or pad, the non-planar surfaces of rounded perimeter portion 134 may be adequately polished using the processes discussed herein.

Also shown in FIG. 6D, substantially all of outer surface 126 may have undergone polishing processes to form an intermediate polish 136 on outer surface 126. In a non-limiting example, and similar to planar portion 132 of inner surface 124, planar portion 132 of outer surface 126 may be polished using a CMP process and/or a DMP process. Additionally, outer surface 126 of rounded perimeter portion 134 may have undergone two polishing processes to form intermediate polish 136, as similarly discussed and shown in FIG. 6D with respect to inner surface 124 of rounded perimeter portion 134. That is, the two polishing processes performed on outer surface 126 of rounded perimeter portion 134 may include a first polishing process using a polishing brush or pad (not shown), and a second polishing process using blasting media 142, as discussed herein. The intermediate polishing of sapphire material 140 forming cover 112, as shown in FIG. 6D, may correspond to operation 504 of FIG. 5.

FIG. 6E depicts sapphire material 140 forming cover 112 after completion of the intermediate polishing processes shown in FIG. 6D. All surfaces of sapphire material 140 forming cover 112 may have intermediate polish 136. In a non-limiting example, both inner surface 124 and outer surface 126 of planar portion 132 and rounded perimeter portion 134 may only have intermediate polish 136.

Additionally, FIG. 6E shows sapphire material 140 after an annealing process has been performed. More specifically, sapphire material 140, including all surfaces within intermediate polish 136, may undergo an annealing process to fill or otherwise seal any cracks or damage done to the sapphire material during the shaping processes or the polishing processes. The annealing of sapphire material 140 may also harden the sapphire. The annealing of sapphire material 140 generally corresponds to operation 506 of FIG. 5.

FIG. 6F shows sapphire material 140 subsequent to the final polishing processes. In a non-limiting example, as shown in FIG. 6F, sapphire material 140 forming cover 112 may have undergone final polishing processes to form final polish 138 on at least a portion of the surfaces of cover 112. As shown in FIG. 6F, outer surface 126 of cover 112 may only have final polish 138. That is, final polish 138 may substantially cover all of outer surface 126 of cover 112 included in both planar portion 132 and rounded perimeter portion 134. Distinct from outer surface 126, inner surface 124 of cover 112 may have both intermediate polish 136 and final polish 138. More specifically, as shown in FIG. 6F, inner surface 124 of cover 112 included in planar portion 132 may have final polish 138 and inner surface 124 of rounded perimeter portion 134 of cover 112 may have intermediate polish 136. Additionally as shown in FIG. 6F, intermediate polish 136 may also be formed in groove 128 of cover 112. Intermediate polish 136 formed on inner surface 124 of rounded perimeter portion 134 may be formed and remain through the annealing process of sapphire material 140. That is, intermediate polish 136 may remain on inner surface 124 during the final polish process as a result of forming intermediate polish 136 on inner surface prior to annealing sapphire material 140 and/or not performing a final polishing process on inner surface 124 of rounded perimeter portion 134 after performing the annealing process. As discussed herein, the portions of surface of cover 112 that may or may not have final polish 138 may be dependent, at least in part, on thickness of cover 112 between groove 128 and outer surface 126.

Similar to the intermediate polishing process discussed herein with respect to FIG. 6D, the final polishing process may include a variety of polishing processes. That is, dependent upon the surface (e.g., inner surface 124, outer surface 126) and/or the portion (e.g., planar portion 132, rounded perimeter portion 134) of cover 112 being finally polished, the polishing process may vary. For example, as shown in FIG. 6F and as similarly discussed herein with respect to FIG. 6D, outer surface 126 of planar portion 132 may be polished using a CMP and/or a DMP process, while outer surface 126 of rounded perimeter portion 134 may be polished using two distinct polishing processes; one process using a polishing brush or pad, and one process using blast media 142 (see, FIG. 6D). The final polishing process performed cover 112, as shown in FIG. 6F, may correspond to operation 508 in FIG. 5.

Figure 6G:
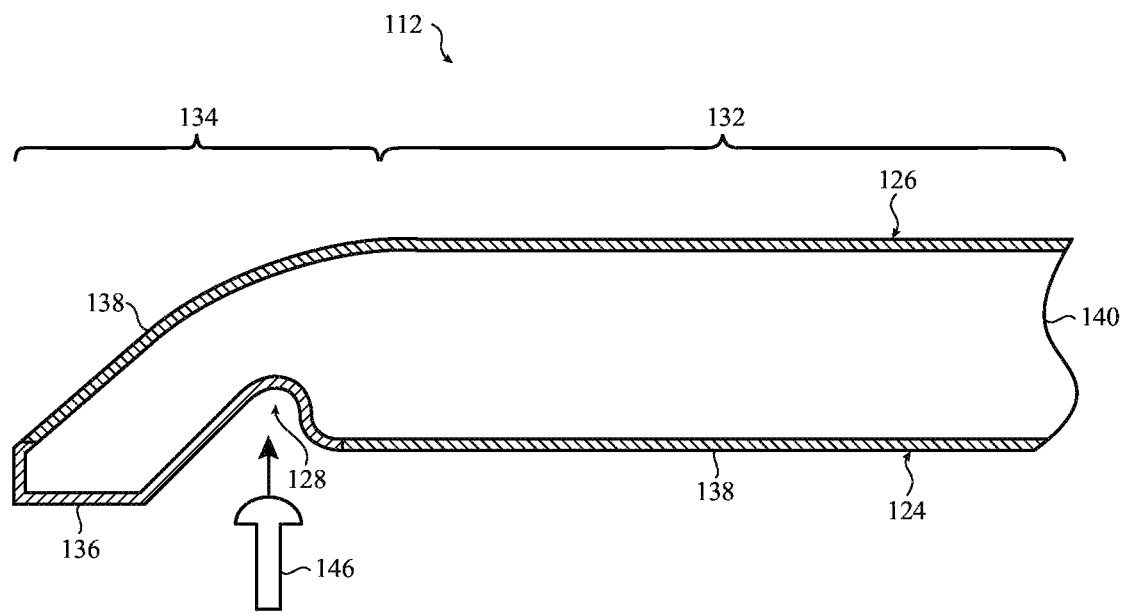
FIG. 6G depicts a cross-sectional view of the sapphire material of FIG. 6A undergoing a preliminary pad printing process for forming the cover for an electronic device as depicted in FIGS. 1 and 2, according to embodiments.
Figure 6H:
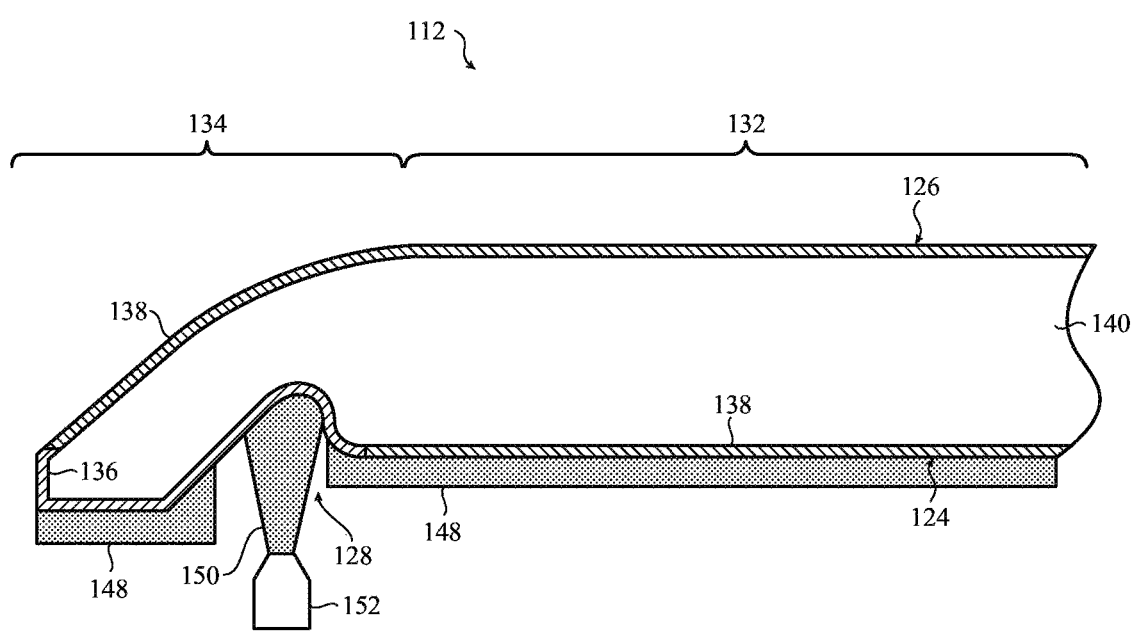
FIG. 6H depicts a cross-sectional view of the sapphire material of FIG. 6A undergoing a decorative ink application process for forming the cover for an electronic device as depicted in FIGS. 1 and 2, according to embodiments.
Figure 6I:
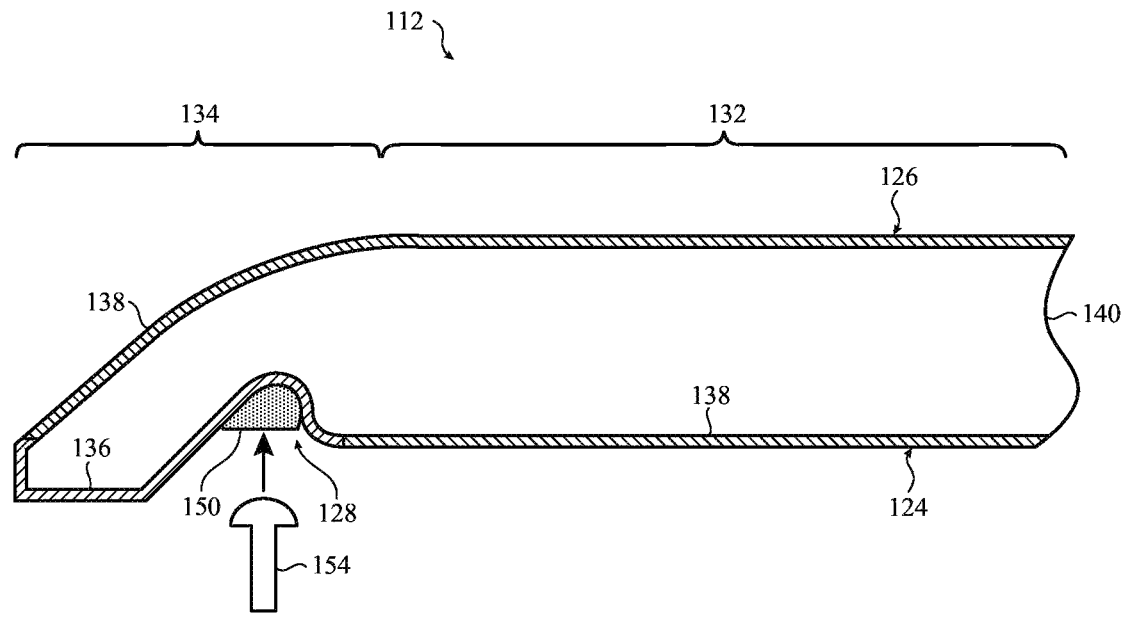
FIGS. 6I and 6J depict cross-sectional views of the sapphire material of FIG. 6A undergoing a subsequent pad printing process for forming the cover for an electronic device as depicted in FIGS. 1 and 2, according to embodiments.
Figure 6J:
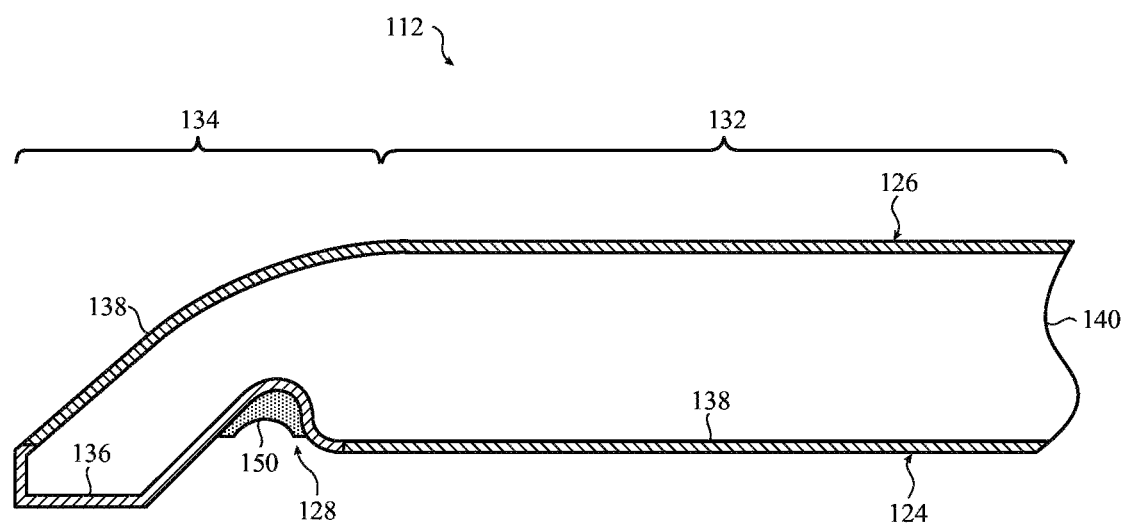

FIGS. 6G-6J generally depict the process of applying a decorative ink (for example, as shown in FIGS. 6H-6J) into groove 128 formed in sapphire material 140. The applying of the decorative ink to groove 128, as shown in FIGS. 6G-6J, may correspond to optional operation 510 in FIG. 5.

Prior to the application of the decorative ink, a preliminary pad printing process may be performed on groove 128 of cover 112. In a non-limiting example, as shown in FIG. 6G, a preliminary printing pad 146 may be aligned with groove 128, and may move toward cover 112 to contact groove 128 during a preliminary pad printing process. Preliminary printing pad 146 may contain a decorative ink and/or a decorative image formed from ink, and may provide the ink/image to groove 128 by contacting inner surface 124 within groove 128. A user or viewer of electronic device 100 may see decorative ink and/or decorative image through transparent cover 112. The process may be considered preliminary insofar as another ink deposition process (e.g., a subsequent process) may be performed after the pad printing, at least in some embodiments.

The process of applying the decorative ink to groove 128 may also include covering a portion of sapphire material 140 positioned adjacent groove 128 with a protective mask 148. That is, and as shown in FIG. 6H, protective mask 148 may be disposed on and substantially cover inner surface 124 of cover 112, except for the portion of inner surface 124 included in groove 128. As discussed herein, protective mask 148 may substantially protect and/or prevent any sprayed decorative ink 150 from undesirably contacting or forming on inner surface 124, other than in groove 128.

FIG. 6H depicts another process for applying decorative ink 150 into groove 128 of cover 112. In a non-limiting example, FIG. 6H shows the process of spraying groove 128 with a decorative ink 150. Decorative ink 150 may be sprayed or applied to inner surface 124 of groove 128 using sprayer 152, to ensure all of inner surface 124 in groove 128 is covered by decorative ink 150. As discussed herein, decorative ink 150 may form a second ink layer and/or second decorative image within groove 128.

The applying of the decorative ink may finally include performing a subsequent pad printing process on groove 128 including decorative ink 150. In a non-limiting example, as shown in FIGS. 6I and 6J, a final or subsequent pad printing process may be performed on groove 128 using a distinct printing pad 154. As shown in FIG. 6I, prior to performing the final or subsequent pad printing process on groove 128, protective mask 148 may be removed from inner surface 124 of cover 112. However, it is understood that protective mask 148 may also be removed after the subsequent pad printing process on groove 128 to continue to protect inner surface 124 from undesirable decorative ink 150 application to a portion of inner surface 124.

Similar to preliminary printing pad 146 as discussed herein with respect to FIG. 6G, distinct printing pad 154 may be aligned with groove 128, and may move toward cover 112 to contact groove 128 during a final or subsequent pad printing process. Distinct printing pad 154 may contain a final decorative ink layer and/or a final decorative image formed from ink, and may provide the ink/image to groove 128 by contacting inner surface 124 within groove 128. Additionally, distinct printing pad 154 may contact groove 128 to remove any excess decorative ink that may be sprayed on inner surface 124 of groove 128 during the spraying process, as shown and discussed herein with respect to FIG. 6H. The final decorative ink layer and/or final decorative image, as shown in FIG. 6J, may be seen by a user of electronic device 100 (see, FIG. 1) including cover 112.

It is understood that sapphire material 140 forming cover 112 may undergo further processes subsequent to the polishing and/or painting of groove 128, as discussed herein with respect to FIGS. 6A-6J. That is, subsequent to the polishing of groove 128 and/or subsequent to the painting of groove 128, cover 112 formed from sapphire material 140 may undergo further formation processes. Various portions and/or surfaces of sapphire material 140 forming cover 112 may undergo a plurality of processes including rough/fine CNC machining processes, DMP processes, lapping processes, chemical mechanical polishing (CMP) processes and/or coating processes. Each process performed on the various portions and/or surface of sapphire material 140 may aid the formation of cover 112. In non-limiting examples, performing a fine CNC machining process within cavity 141 and/or on inner surface 124 may improve a surface finish on inner surface 124, or performing a CMP on inner surface 124 within cavity 141 may reduce fogginess within cover 112. In an additional non-limiting example, performing a DMP process on sidewalls of groove 128 in perimeter portion 134 may maintain edge shape to meet cosmetic tolerances for cover 112.

Groove 128 and/or portions of cover 112 surrounding groove 128 may be painted or inked using distinct processes, such as those discussed above with respect to FIGS. 6G-6J. In non-limiting examples shown in FIGS. 7A-9D, groove 128 and the portions of cover 112 surrounding groove 128 may be painted or inked using two distinct processes, which includes pad printing, and spraying ink into groove 128 and portions of cover 112 surrounding groove 128. As discussed herein, the non-limiting examples may also utilize a masking structure to prevent ink from being applied to undesired portions of cover 112.

Figure 7A:
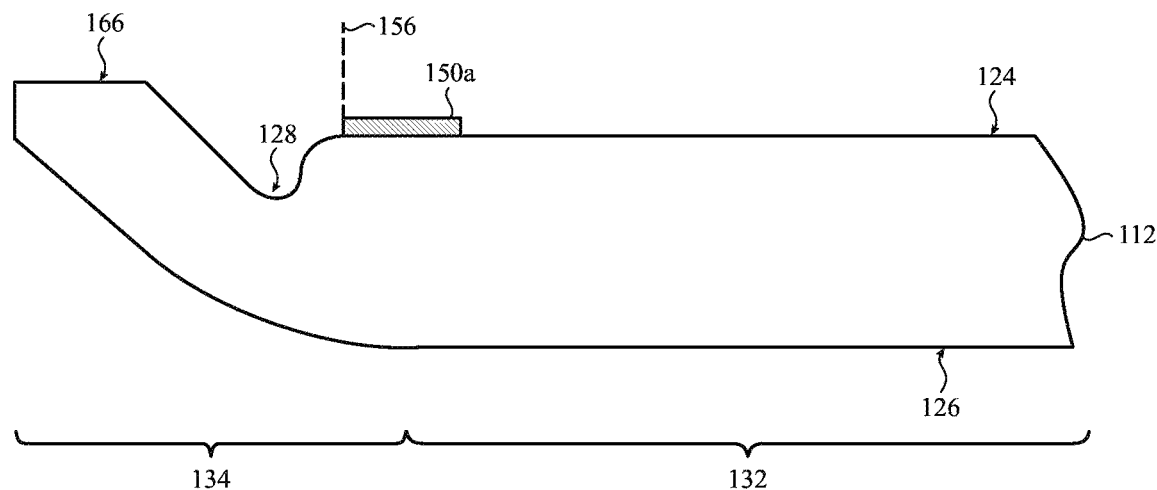
FIGS. 7A-7E depict a cross-sectional view of sapphire material for forming a cover of an electronic device as depicted in FIGS. 1 and 2, undergoing a decorative ink application process, according to embodiments.

As shown in FIG. 7A, cover 112 may initially have ink 150a applied to a portion of inner surface 124 adjacent groove 128. In a non-limiting example, ink 150a formed on inner surface 124 may be formed adjacent groove 128 and may end or stop at a transition point 156 of cover 112. Transition point 156 may be understood as the portion of cover 112 where inner surface 124 is no longer planar or parallel with outer surface 126, but rather, transition point 156 may include the beginning of groove 128 formed in cover 112. Additionally, transition point 156 may also separate planar portion 132 and rounded perimeter portion 134 of cover 112. As such, ink 150a may only be applied on a planar portion of inner surface 124 of cover 112. Ink 150a may be formed on inner surface 124 adjacent groove 128 using, for example, a pad printing process or a silk screening process.

Although discussed herein as ending at and/or aligned with transition point 156, it is understood that ink 150a may stop prior to reaching transition point 156. That is, ink 150a may not be aligned with transition point 156, but rather, may end just prior to and/or adjacent to transition point 156 of cover 112.

Once ink 150a is pad printed on inner surface 124 of cover 112, a masking structure 158 may be placed over inner surface 124. In a non-limiting example shown in FIG. 7B, masking structure 158 may be formed over and/or on a portion of inner surface 124, over at least a portion of the ink 150a and adjacent to the groove 128. Masking structure 158 may be formed from a protective film 160 placed on the inner surface 124 of cover 112, a spacer 162 coupled to the protective film 160, and a rigid top component 164 positioned above spacer 162. As discussed herein, masking structure 158 may allow ink to be sprayed into groove 128, while simultaneously prevent ink from being sprayed on the entirety of ink 150a applied to inner surface 124, and/or directly on inner surface 124. Furthermore, and as discussed herein, masking structure 158 may also allow for there to be a smooth transition and/or a substantially uniform thickness between ink 150a that may be applied using a pad printing process and ink 150b (see, FIG. 7C) that may be applied using a spray process. In many embodiments, any transition between the inks 150a, 150b is not detectable to the human eye.

Figure 7B:
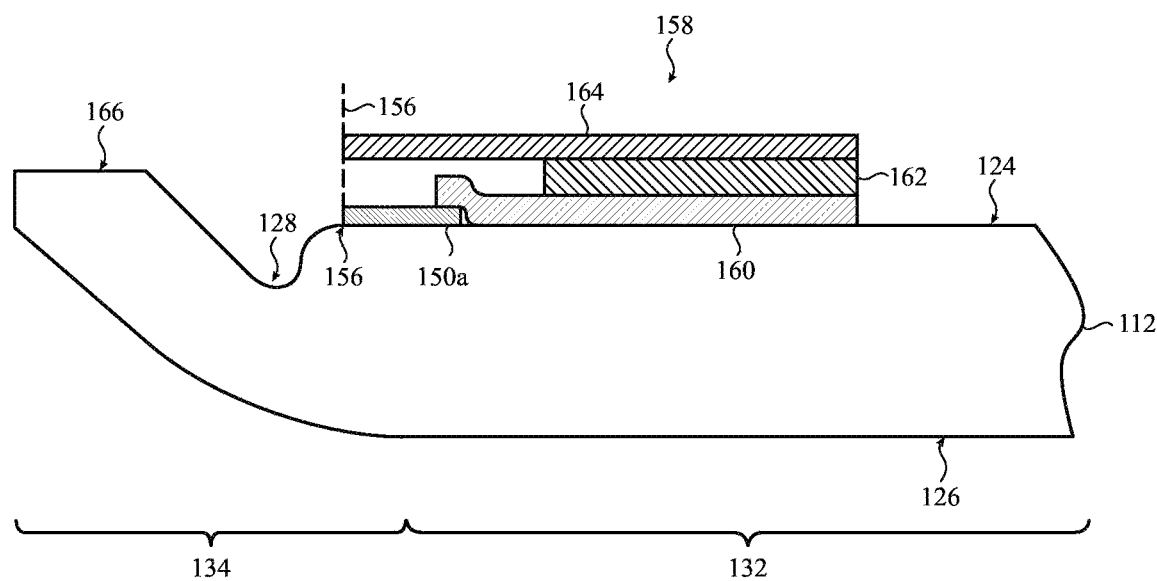

Protective film 160 may be coupled directly to inner surface 124 of cover 112. Additionally, and as shown in FIG. 7B, a portion of protective film 160 may also be coupled to and/or substantially cover a portion of ink 150a, opposite groove 128 and transition point 156a. Protective film 160 may cover the portion of ink 150a positioned opposite groove 128 to ensure that no ink may be sprayed directly onto inner surface 124 of cover 112 during a spraying process, as discussed herein. Protective film 160 may be coupled to inner surface 124, and a portion of ink 150a, using any suitable adhesive (not shown) having low tack properties and/or characteristics. Adhesive having low tack properties may be used to adhere or couple protective film 160 to inner surface 124 and/or ink 150a to prevent protective film 160 from becoming uncoupled from inner surface 124. Additionally, the low tack properties of the adhesive used on protective film 160 may allow protective film 160 to be easily removed (i.e., no adhesive residue left on inner surface 124) and/or prevent protective film 160 from removing ink 150a from inner surface 124 when masking structure 158 is removed from cover 112, as discussed herein. In some implementations, the protective film 160 is placed on the inner surface 124 and a portion of the ink 150a without the use of an adhesive.

Spacer 162 of masking structure 158 may be positioned between and/or coupled to protective film 160 and rigid top component 164. Additionally, spacer 162 may couple rigid top component 164 to protective film 160. In the non-limiting example, spacer 162 may be formed from any suitable double-sided adhesive that may couple rigid top component 164 to protective film 160. As shown in FIG. 7B, spacer 162 may only be coupled and/or formed between a portion of protective film 160 and rigid top component 164. In the non-limiting example, spacer 162 may be positioned between protective film 160 and rigid top component 164 at a distance away from groove 128 and/or transition point 156, and may not cover any portion of ink 150a. As discussed herein, by not covering any portion of ink 150a, spacer 162 may allow ink 150b applied by sprayer 152 (see, FIG. 7C) to be sprayed and/or formed over a portion of ink 150a.

Rigid top component 164 may be coupled to the double-sided adhesive forming spacer 162 as discussed herein. As shown in FIG. 7B, rigid top component 164 may extend to transition point 156, and/or may be positioned directly adjacent groove 128 formed in cover 112. Additionally, rigid top component 164 may be positioned above, but may not necessarily cover, ink 150a formed on inner surface 124 of cover 112. That is, and as discussed herein, rigid top component 164 may not directly cover ink 150a because of the positioning of spacer 162 within masking structure 158. However, rigid top component 164 may be positioned above ink 150a, and may substantially prevent ink 150a from being sprayed directly onto the surface by sprayer 152 during an ink spraying process. Rigid top component 164 may be formed from any suitable rigid material that may hold its form during the spraying process discussed herein. In non-limiting examples, rigid top component 164 may be formed from a glass sheet, a fiberglass sheet or a reinforced plastic sheet.

Figure 7C:
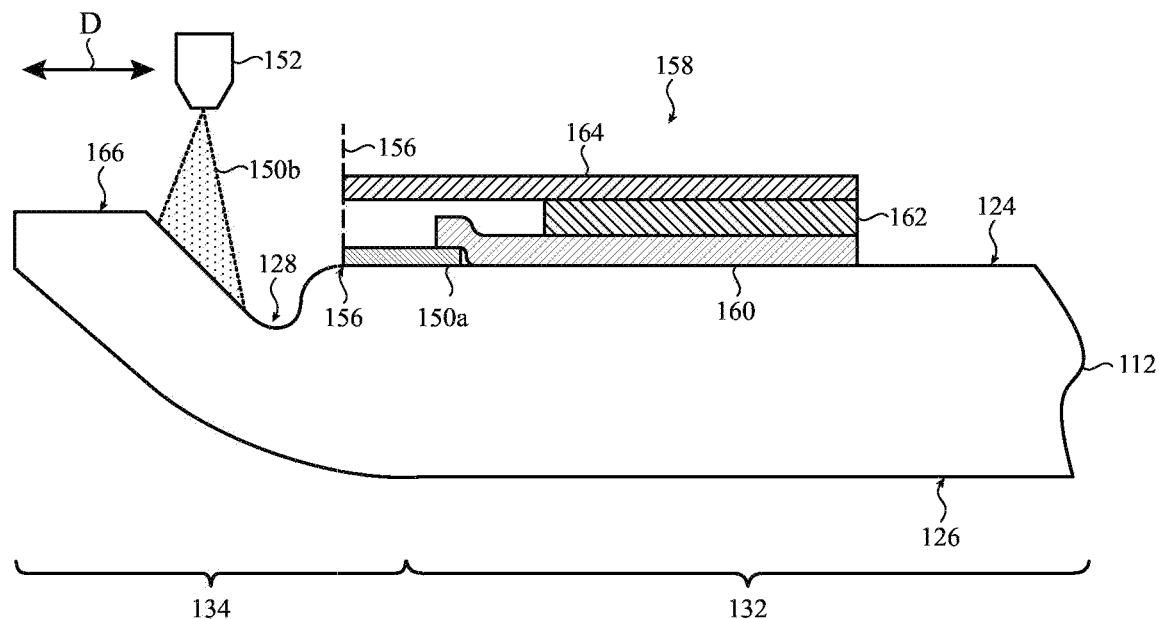
Figure 7D:
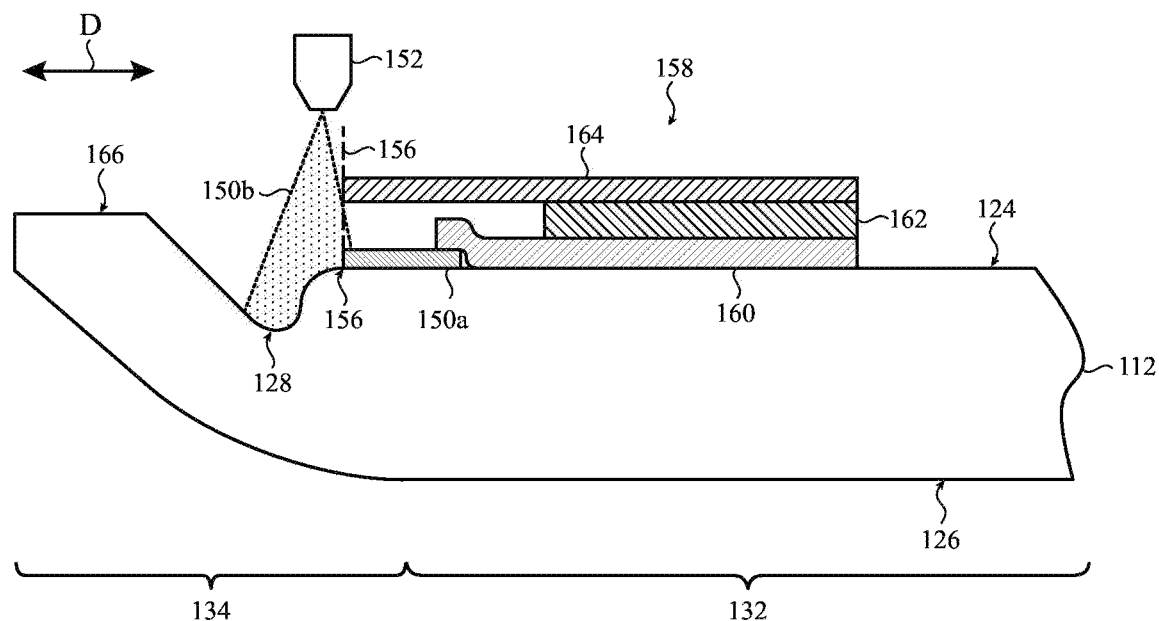

FIG. 7C shows a spraying process being performed on cover 112. In a non-limiting example, and as similarly discussed herein with respect to FIG. 6H, sprayer 152 may be utilized to apply ink 150b to cover 112. Ink 150b sprayed or applied by sprayer 152 may be diffused as it is applied to cover 112. As a result of diffusing ink 150b, and as discussed herein, ink 150b may be applied directly to portions of cover 112 (e.g., groove 128), when sprayer 152 is positioned directly above the portion of cover 112, and ink 150b may be indirectly applied to surrounding portions of cover 112 that are adjacent the portion of cover 112 that is receiving the directly applied ink 150b.

As shown in FIG. 7C, sprayer 152 may directly apply ink 150b into groove 128 of cover 112. Sprayer 152 may also directly apply ink 150b to contact surface 166 of rounded perimeter portion 134 of cover 112, which may be subsequently coupled to and/or contact shelf portion 120 of housing 102, as similarly discussed herein with respect to FIGS. 2-4. Sprayer 152 may move in a direction (D) to spray, apply and/or cover groove 128 and contact surface 166 with ink 150b. Sprayer 152 may make a single pass over groove 128 and contact surface 166, or may make multiple passes over groove 128 and contact surface 166 when spraying and/or forming a uniform layer of ink 150b on cover 112.

As discussed herein, rigid top component 164 of masking structure 158 may be positioned over ink 150a and may substantially prevent sprayer 152 from directly spraying ink 150b onto ink 150a. However, because of sprayer's 152 ink-diffusive characteristics, a portion of ink 150b may be indirectly sprayed or deposited on a portion of ink 150a, directly adjacent transition point 156. In a non-limiting example shown in FIG. 7D, as sprayer 152 moves toward ink 150a and masking structure 158, respectively, ink 150b may be directly applied to groove 128 and transition point 156. Additionally, ink 150b may be indirectly sprayed under rigid top component 164, and may be applied to a small portion of ink 150a positioned adjacent transition point 156. The amount of ink 150b that may be indirectly applied to ink 150a may be minimal and/or much less when compared to the amount of ink 150b applied directly to groove 128 and/or contact surface 166. As discussed herein, rigid top component 164 may prevent ink 150b from being directly applied to ink 150a as sprayer 152 moves in a direction (D) toward and/or over rigid top component 164. That is, because rigid top component 164 of masking structure 158 is positioned over ink 150a formed on inner surface 124, ink 150b from sprayer 152 may not be directly sprayed or deposited on ink 150a when sprayer 152 is positioned directly above rigid top component 164.

Figure 7E:
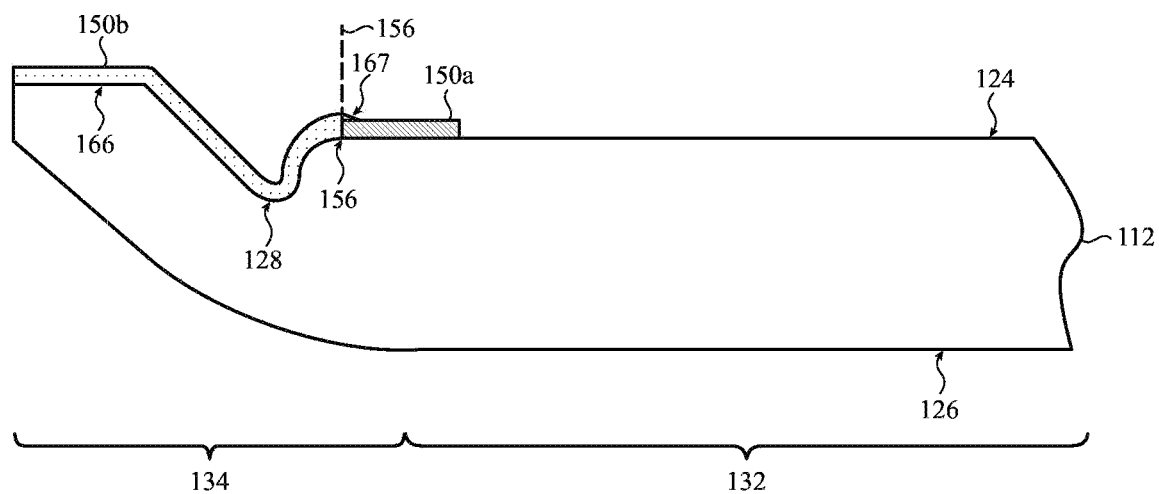

FIG. 7E shows cover 112 after ink 150a is pad printed on inner surface 124 and ink 150b is sprayed on groove 128 and contact surface 166. In the non-limiting example shown in FIG. 7E, ink 150a and ink 150b may be substantially continuous on cover 112. Additionally, ink 150a and 150b may include substantially uniform thicknesses throughout, and each thickness of ink 150a and ink 150b may be substantially equal to each other. However, as shown in FIG. 7E, and discussed herein with respect to FIG. 7D, an overlapping portion 167 of ink 150b adjacent transition point 156 may be indirectly deposited over ink 150a. Overlapping portion 167 of ink 150b indirectly deposited on ink 150a may be minimal and/or negligible and may not affect the appearance and/or function of ink 150a and/or ink 150b. Although shown as having a minimal and/or slight thickness increase where overlapping portion 167 of ink 150b is indirectly deposited on ink 150a, ink 150b deposited on ink 150a may form a substantially smooth, gradual controlled and/or seamless transition between ink 150a and ink 150b of cover 112. That is, by allowing a minimal amount of ink 150b to be indirectly deposited on ink 150a, the transition between ink 150a and ink 150b may be substantially smooth and/or seamless, without changing, and specifically increasing, the thickness of the deposited ink significantly and/or over an extended length of ink 150a.

FIGS. 8A-8D show another non-limiting example for applying ink 150 to groove 128 and portions of cover 112 positioned adjacent to groove 128 using a pad printing process and a spraying process. It is understood that similarly numbered components may function in a substantially similar fashion. Redundant explanation of these components has been omitted for clarity.

Figure 8A:
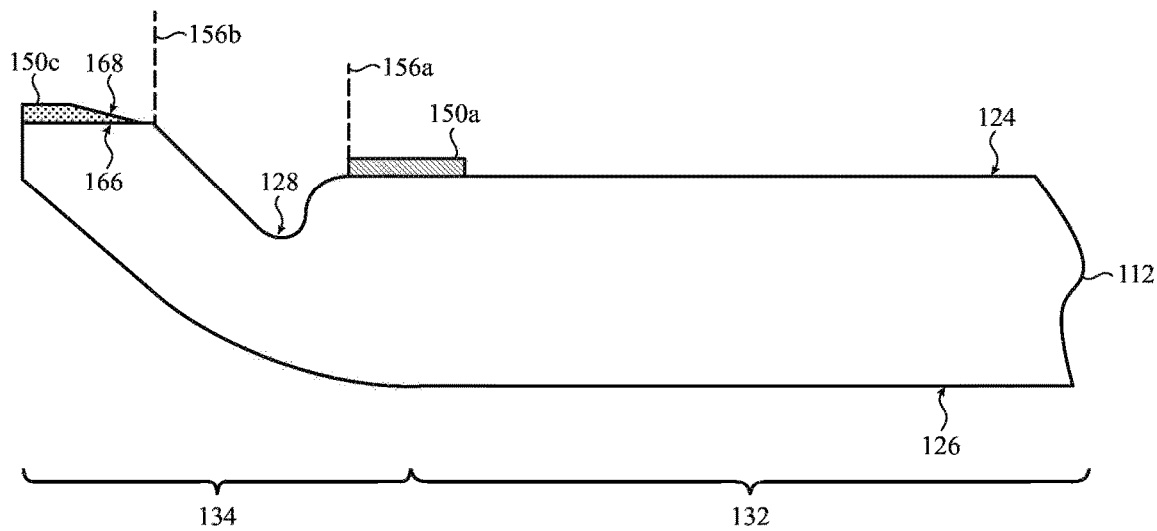
FIGS. 8A-8D depict a cross-sectional view of sapphire material for forming a cover of an electronic device as depicted in FIGS. 1 and 2, undergoing a decorative ink application process, according to further embodiments.

Distinct from the non-limiting example shown in FIGS. 7A-7E, contact surface 166 may also undergo a pad printing process. In the non-limiting example shown in FIG. 8A, ink 150c may be applied to at least a portion of contact surface 166 of cover 112 using a pad printing process similarly discussed herein with respect to FIG. 7A and ink 150a. However, distinct from ink 150a, which may include a uniform thickness, ink 150c pad printed on contact surface 166 of cover 112 may include a sloped portion 168, which may have a gradually decreasing thickness. Sloped portion 168 may be formed in ink 150c during the pad printing process. As shown in FIG. 8A, sloped portion 168 may be formed in only a portion of ink 150c, however, it is understood that ink 150c may include sloped portion 168 formed over the entire length of ink 150c. Additionally, distinct from ink 150a, ink 150c formed on contact surface 166 may not end and/or be positioned directly adjacent transition point 156b (i.e., transition between planar portion of cover 112 and groove 128) of contact surface 166. Rather, ink 150c may be positioned proximate and/or spaced a distance away from transition point 156b. As discussed herein, the gradually decreasing thickness of ink 150c and ink 150c positioning with respect to transition point 156b may allow ink 150b to form a seamless transition over ink 150c on contact surface 166 and into groove 128.

Figure 8B:
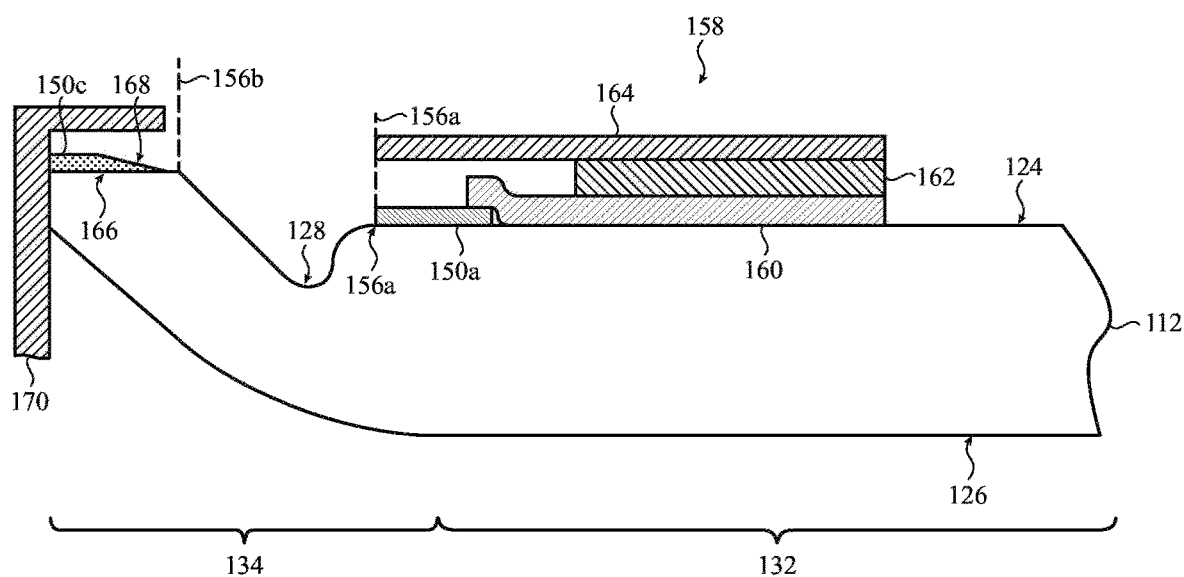

Turning to FIG. 8B, masking structure 158 may also be utilized to prevent spraying ink 150b on portions of inner surface 124 of cover 112. In the non-limiting example shown in FIG. 8B, a protective fixture 170 may be secured to cover 112. Similar to rigid top component 164, protective fixture 170 may be positioned above, but may not directly cover ink 150c, such that during a spraying process, ink 150b sprayed in groove 128 may also be sprayed and/or applied to ink 150c, as discussed herein. In the non-limiting example shown in FIG. 8B, protective fixture 170 may also extend over contact surface 166 only as far as ink 150c, and may be secured to the side of cover 112 to prevent any ink 150b from being undesirably sprayed on outer surface 126 during the spraying process discussed herein. Protective fixture 170 may be formed from a substantially similar material (e.g., glass, fiberglass, reinforced plastic and so on) or from a material having substantially similar characteristics (e.g., rigid) as rigid top component 164 of masking structure 158.

Figure 8C:
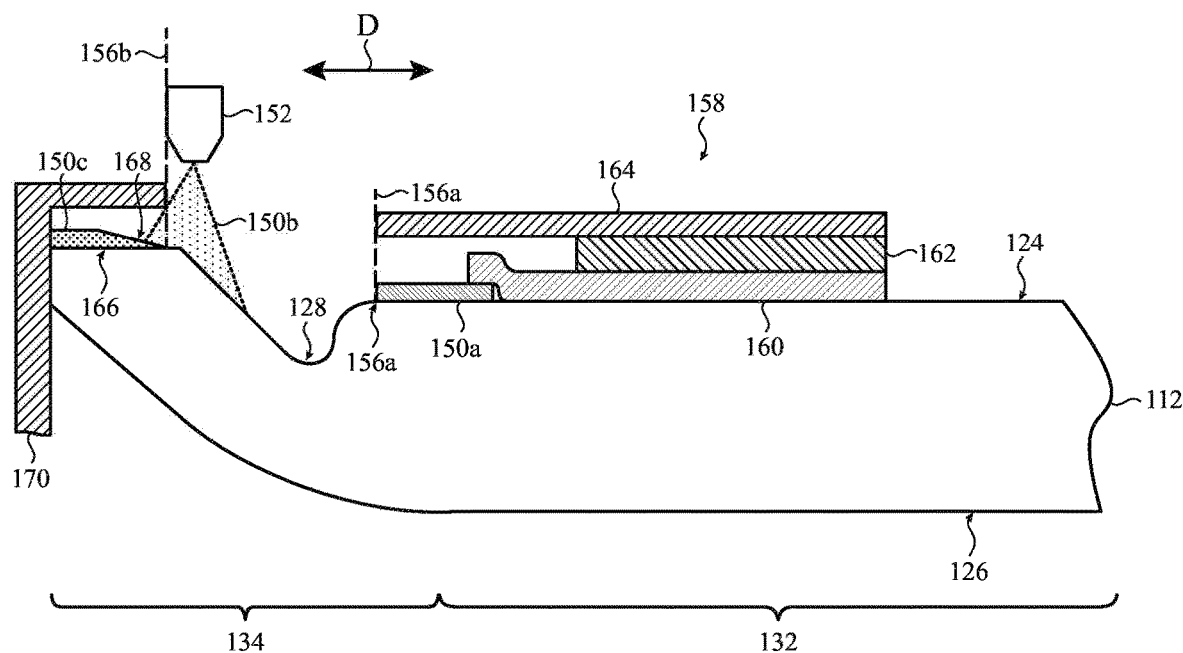

FIG. 8C shows the ink spraying process performed on cover 112. As similarly discussed herein with respect to FIG. 7D and masking structure 158, the gap or space between ink 150c and protective fixture 170 may allow sprayer 152 to indirectly spray and/or apply ink 150b over at least a portion of ink 150c. In the non-limiting example, ink 150b may be indirectly sprayed, applied and/or cover sloped portion 168 of ink 150c as sprayer 152 moves in a direction (D) toward protective fixture 170 and ink 150c on contact surface 166 of cover 112. Additionally, the positioning of protective fixture 170 over ink 150c may prevent sprayer 152 from directly applying ink 150b to ink 150c when sprayer 152 is positioned directly above ink 150c, and/or protective fixture 170.

Figure 8D:
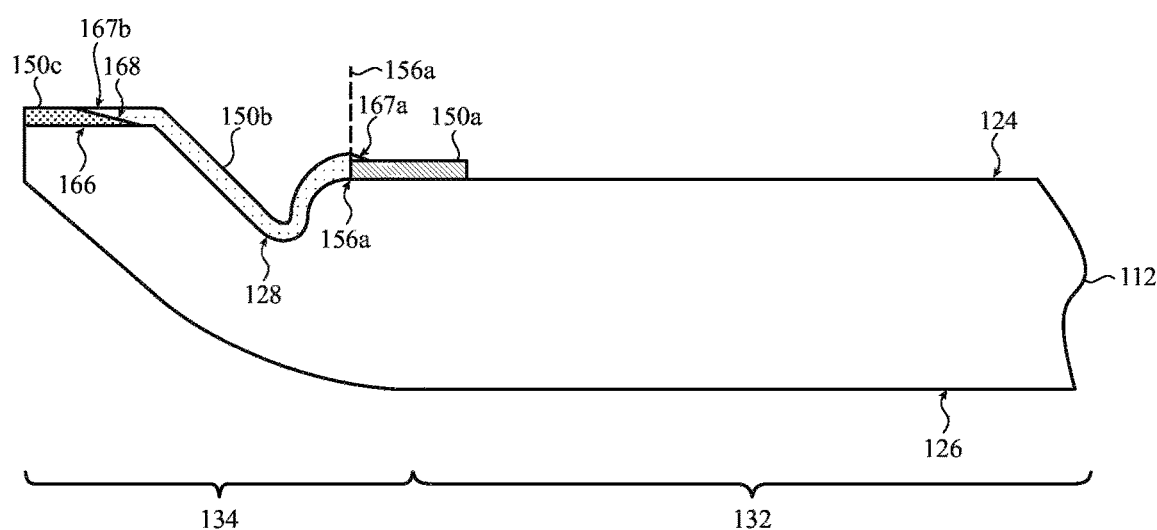

Turning to FIG. 8D, the indirect spraying and/or applying of ink 150b to ink 150c having the gradually reducing thickness, may allow ink 150b, 150c formed on contact surface 166 to have a substantially uniform thickness. In the non-limiting example, and as similarly discussed herein with respect to FIG. 7E, ink 150a, ink 150b and ink 150c may all have a similar and/or uniform thickness after the pad printing and spraying process is performed on cover 112. Additionally, as shown in FIG. 8D, by forming ink 150c with sloped portion 168, and subsequently applying overlapping portion 167b of ink 150b over sloped portion 168, a substantially smooth, gradual controlled and/or seamless transition between ink 150b and ink 150c may be formed on contact surface 166 at overlapping portion 167b.

Figure 9A:
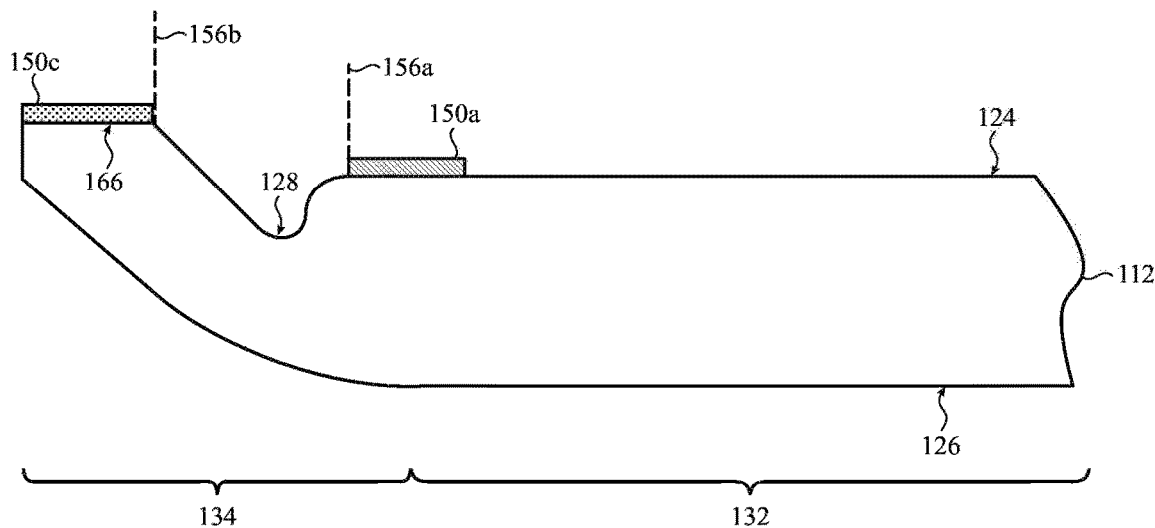
FIGS. 9A-9D depict a cross-sectional view of sapphire material for forming a cover of an electronic device as depicted in FIGS. 1 and 2, undergoing a decorative ink application process, according to additional embodiments.

FIGS. 9A-9D show another non-limiting example for applying ink 150 to groove 128 and portions of cover 112 positioned adjacent to groove 128 using a pad printing process and a spraying process. Similar to FIG. 8A, the non-limiting example in FIG. 9A may also pad print ink 150c on contact surface 166 of cover 112 prior to performing an ink spraying process. However, distinct from FIG. 8A, ink 150c pad printed onto contact surface 166 may include a uniform thickness, similar to ink 150a formed on inner surface 124. Also similar to ink 150a, ink 150c formed on contact surface 166 may be formed directly adjacent groove 128, and may end at transition point 156b of contact surface 166, as shown in FIG. 9A.

Figure 9B:
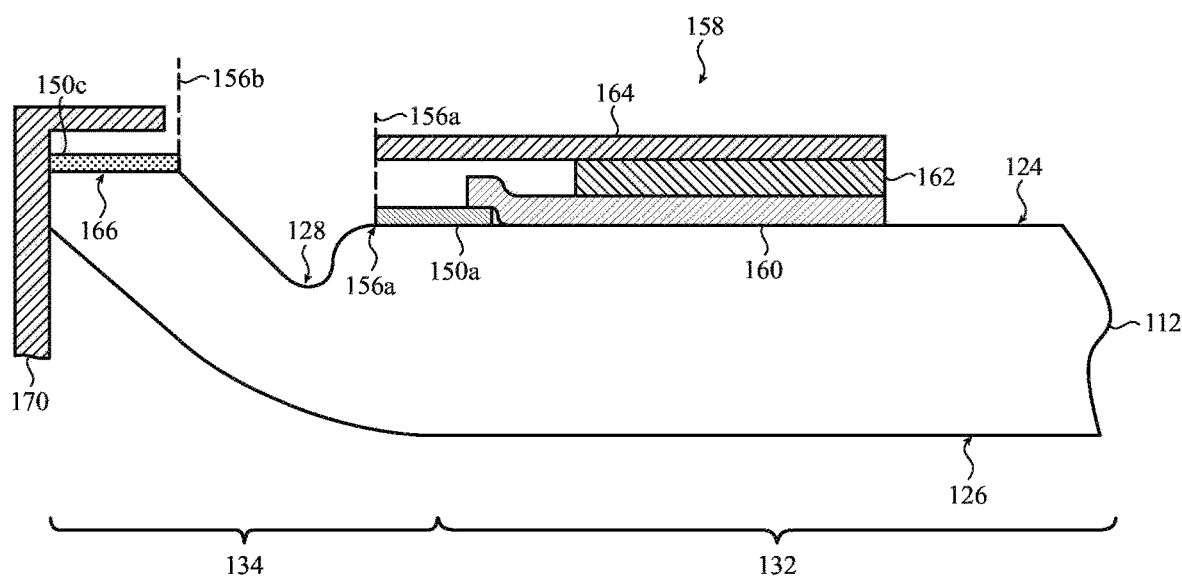

As shown in FIG. 9B, masking structure 158 and protective fixture 170 may be utilized during an ink spraying process to prevent ink 150b from being sprayed on portions of cover 112 (e.g., portion of inner surface 124, outer surface 126) which do not require ink 150. In the non-limiting example shown in FIG. 9B, and distinct from FIG. 8B, protective fixture 170 may be positioned over and may directly cover at least a portion of ink 150c formed on contact surface 166. Protective fixture 170 may directly contact and cover a portion of ink 150c, such that the covered portion of ink 150c may not be sprayed and/or covered by ink 150b during the ink spraying process (see, FIG. 9C).

Also shown in FIG. 9B, protective fixture 170 may not completely cover ink 150c formed on contact surface 166 because protective fixture 170 may not extend all the way to transition point 156b. Rather, protective fixture 170 may be positioned proximate and/or spaced a distance away from transition point 156b. As a result, the portion of ink 150c positioned directly adjacent transition point 156b may be exposed during the ink spraying process and may be covered by ink 150b, as discussed herein.

Figure 9C:
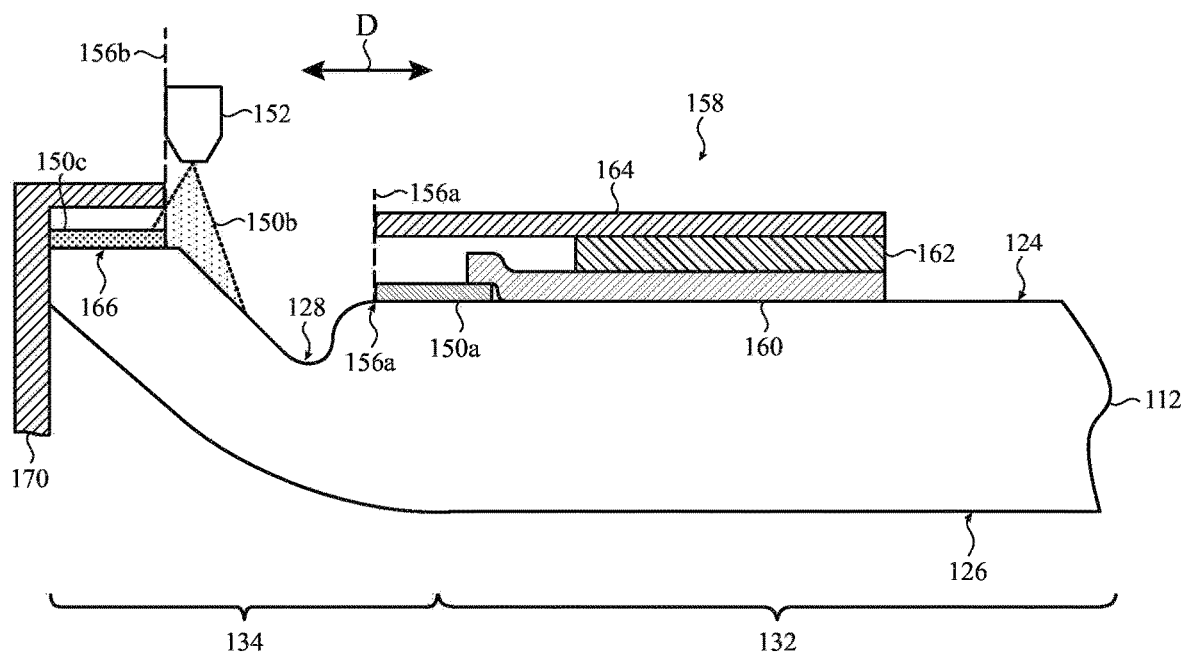

FIG. 9C shows the ink spraying process performed on cover 112. During the ink spraying process, ink 150b may substantially be indirectly sprayed, applied and/or cover the exposed portion of ink 150c formed on contact surface 166. In the non-limiting example, protective fixture 170 positioned directly on ink 150c may only prevent sprayer 152 from directly or indirectly applying ink 150b to the covered portions of ink 150c. However, because ink 150c extends to transition point 156b, and protective fixture 170 does not, the exposed portion of ink 150c positioned adjacent groove 128 may be covered by ink 150b.

In order to prevent substantial build-up of ink 150b on ink 150c, and ultimately increase the thickness of ink 150 formed on cover 112, the spray process may be modified. In a non-limiting example, sprayer 152 may have restricted movement in direction (D) toward contact surface 166, such that sprayer 152 may never be positioned directly over contact surface 166, and therefore may not directly spray ink 150b on the exposed portion of ink 150c. In another non-limiting example where sprayer 152 makes multiple passes over groove 128 to apply ink 150b, sprayer 152 may only pass over adjacent exposed portion of ink 150c and/or transition point 156b once to prevent over spraying ink 150c.

Figure 9D:
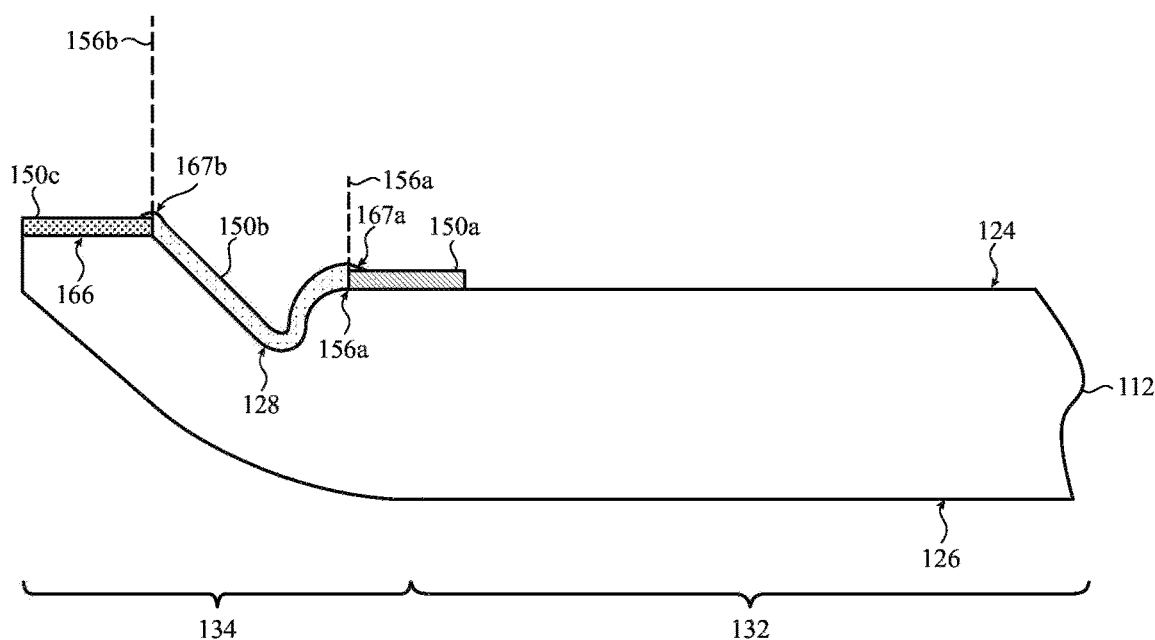

Turning to FIG. 9D, the spraying and/or applying of ink 150b to the exposed portion of ink 150c, may allow ink 150b, 150c to form a substantially smooth, gradual controlled and/or seamless transition between ink 150b and ink 150c on contact surface 166. In the non-limiting example, and as similarly discussed herein with respect to FIG. 7E, ink 150a, ink 150b, and ink 150c may include substantially uniform thicknesses throughout, and each thickness of ink 150a, ink 150b, and ink 150c may be substantially equal to each other. However, and similar to indirectly applied ink 150b covering ink 150a at transition point 156a, the overlapping portion 167b of ink 150b deposited on the exposed portion of ink 150c may be minimal and/or negligible and may not affect the appearance and/or function of ink 150b and/or ink 150c. Although shown as having a minimal and/or slight thickness increase where overlapping portion 167b of ink 150b is deposited on ink 150c, overlapping portion 167b of ink 150b deposited on ink 150c may form a substantially smooth, gradual controlled and/or seamless transition between ink 150b and ink 150c of cover 112. That is, by allowing a minimal amount of ink 150b to be deposited on the exposed portion of ink 150c, the transition between ink 150b and ink 150c may be substantially smooth and/or seamless, without changing, and specifically increasing, the thickness of the deposited ink significantly and/or over an extended length of ink 150c.

Although depicted as different patterns and/or colors in FIGS. 7A-9D, it is understood that ink 150a, 150b, 150c may be the same ink material, and may only be shown using different patterns and/or colors to indicate the distinct processes for forming ink 150a, 150b, 150c. In another limiting embodiment, it may also be understood that ink 150a, 150b, 150c may represent different ink material for forming each of the ink portions on cover 112.

The dimensions (e.g., length, thickness, and so on) of each component forming masking structure 158/protective fixture 170 and/or the positioning of masking structure 158/protective fixture 170 with respect to transition point 156a and transition point 156b may be based on, at least in part, the properties and/or characteristics of ink 150 and/or the spraying process performed on cover 112. In non-limiting examples, the distance of gap formed between rigid top component 164 and ink 150a, and/or the distance between rigid top component 164 and transition point 156a may be based on, but is not limited to, the size of sprayer 152, the output (i.e., volume) of ink 150b dispensed by sprayer 152, the distance between sprayer 152 and cover 112, the number of passes for sprayer 152 to form ink 150b in groove 128, characteristics and/or physical characteristics of ink 150 (e.g., viscosity, color, chemical composition, etc.) and so on.

Figure 10:
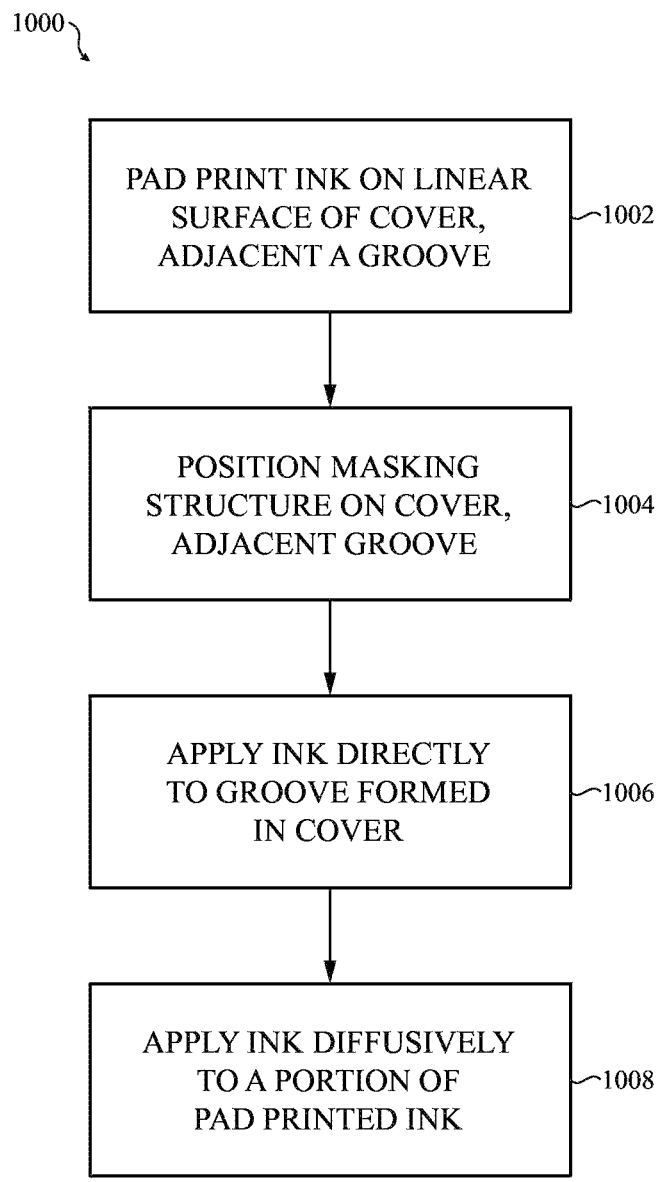
FIG. 10 depicts a flow chart of an example process for applying a decorative ink to a cover for an electronic device, according to embodiments.

FIG. 10 depicts an example process for applying decorative ink to a cover for an electronic device. Specifically, FIG. 10 is a flowchart depicting one example process 1000 for applying decorative ink to a groove and/or other portions of a cover for an electronic device. In some cases, the process 1000 may be used to form one or more covers 112 for electronic device 100, as discussed above with respect to FIGS. 7A-9D.

In operation 1002, ink may be pad printed on at least a portion of a planar surface of the cover. The portion of the planar surface that may be pad printed may be positioned adjacent a groove formed in the cover. In operation 1004, a masking structure may be positioned on the cover. The masking structure may be positioned adjacent the groove formed in the cover. The masking structure may include, a protective film coupled to the planar surface of the cover, a spacer coupled to a portion of the protective film, and a rigid top component coupled to the spacer. The rigid top component may be positioned over the ink pad printed on at least the portion of the planar surface of the cover, as discussed in operation 1002. In operation 1006, ink may be directly applied to the groove formed in the cover. In operation 1008, ink may be indirectly applied to at least a portion of the ink pad printed on at least the portion of the planar surface of the cover. The indirect applying of the ink in operation 1008 may further comprise forming a seamless transition line between the pad printed ink on the portion of the planar surface and the indirectly applied ink.

Although the processes discussed herein are for forming a cover 112 for electronic device 100, it is understood that the processed may be performed on any component of electronic device 100 including material substantially similar to cover 112. In a non-limiting example, the processes discussed herein may be performed on housing 102, where housing 102 is formed from a sapphire material. Housing 102 may be substantially opaque, but may still be processed and/or polished in a similar manner as discussed herein with respect to cover 112. Likewise, the processes described herein may be used on features other than grooves; any suitable recess, depression or like feature may be formed, polished, and/or inked as described herein.

As discussed herein and shown in FIG. 1, electronic device 100 is implemented as a wearable electronic device, such as a watch. However, it is understood that electronic device 100 may be implemented as any other suitable electronic device, such as, for example, a smart phone, a laptop or desktop computer, a tablet computing device, a gaming device, a display, a digital music player, a health monitoring device, other forms of wearable computing devices (e.g., glasses, jewelry, and the like) and so on. Electronic device 100 may be configured to perform any a variety of functions, including providing health-related information or data such as, but not limited to, heart rate data, blood pressure data, temperature data, oxygen level data, diet/nutrition information, medical reminders, health-related tips or information, or other health-related data. The electronic device may optionally convey the health-related information to a separate electronic device such as a tablet computing device, phone, personal digital assistant, computer, and so on. In addition, electronic device 100 may provide additional information, such as, but not limited to, time, date, health, statuses of externally connected or communicating devices and/or software executing on such devices, messages, video, operating commands, and so forth (and may receive any of the foregoing from an external device), in addition to communications.

Electronic device 100 may include a housing 102 at least partially surrounding a display 104 and one or more buttons 106 or input devices. The housing 102 may form an outer surface or partial outer surface and protective case for the internal components of electronic device 100, and may at least partially surround the display 104. The housing 102 may be formed of one or more components operably connected together, such as a front piece and a back piece. Alternatively, the housing 102 may be formed of a single piece operably connected to the display 104. Housing 102 may formed from a number of distinct materials including, but not limited to, corundum (commonly referred to as sapphire), metal, glass, ceramic and/or plastic. Additionally, housing 102 may include a decorative and/or coating layer that be disposed on the outer and/or or inner surface of housing 102. The decorative layer and/or coating layer may be disposed on the surface(s) of housing 102 to protect the enclosure and/or provide a decorative feature (e.g., exterior color) for electronic device 100. Housing 102, similar to cover 112 discussed herein with respect to FIGS. 2-10, may also include a groove (e.g., groove 128) formed therein that may be formed, shaped, polished, inked and/or painted using similar processes discussed herein.

Housing 102 may also have recesses 108 formed on opposite ends to connect a wearable band 110 to electronic device 100. Wearable band 110 may be used to secure wearable electronic device 100 to a user, or any other object capable of receiving electronic device 100. In a non-limiting example where electronic device 100 is a smart watch, wearable band 110 may secure the watch to a user's wrist. In other non-limiting examples, electronic device 100 may be secured to another part of a user's body.

Display 104 may be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. Cover 112 may be positioned above the touchscreen of display 104 to protect display 104, as discussed herein.

Button 106 may include any suitable input/output (I/O) device for electronic device 100. Specifically, button 106 may include an actuation component in electronic and/or mechanical communication with the internal components of electronic device 100, to provide user input and/or allow the user to interact with the various functions of electronic device 100. In an embodiment, button 106 may be configured as a single component surrounded by housing 102. Alternatively, button 106 may include a number of components, including an actuation component, in mechanical and/or electrical communication with one another and/or internal component of electronic device 100. Button 106 may likewise include or be disposed near a sensor, such as a biometric sensor, touch sensor, or the like. Similar to housing 102 and/or cover 112, button 106 may be formed from corundum or sapphire, and as such, may also include a groove (e.g., groove 128) or similar shape formed in at least a portion of button 106. The groove formed in button 106 may be formed, shaped, polished, inked and/or painted using similar processes discussed herein with respect to groove 128 of cover 112 shown in FIGS. 2-10.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for forming a polished sapphire component comprising a planar surface and a portion defining a groove adjacent to the planar surface, the method comprising:
    performing a first polishing process, on at least one of the planar surface or the portion defining the groove using a polishing tool;
    performing a second polishing process on the portion defining the groove using blasting media;
    printing a first ink layer on the planar surface; and
    printing a second ink layer on the portion defining the groove and over the first ink layer at a transition point between the planar surface and the portion defining the groove, the second ink layer comprising a composition different from a composition of the first ink layer.

2. The method of claim 1, wherein the blasting media is a diamond encrusted resin-based material.

3. The method of claim 1, further comprising shaping the sapphire component prior to performing the first polishing process.

4. The method of claim 3, wherein shaping the sapphire component comprises:
    lapping a sapphire material;
    forming at least one rounded perimeter portion in the sapphire material;
    laser cutting the sapphire material at the portion to define the groove; and
    machining the portion defining the groove.

5. The method of claim 1, wherein printing the second ink layer comprises
    covering at least some of the planar surface with a protective mask;
    spraying the portion defining the groove with the decorative ink; and
    performing a pad printing process on the decorative ink within the groove.

6. The method of claim 1, further comprising annealing the polished sapphire component.

* * * * *